(12) United States Patent
Ito et al.

(10) Patent No.: US 7,953,811 B2
(45) Date of Patent: May 31, 2011

(54) PRESENCE SYSTEM AND INFORMATION PROCESSING EQUIPMENT, DYNAMIC BUDDY LIST GENERATION METHOD IN PRESENCE SYSTEM, AND PRESENCE NOTIFICATION DESTINATION CONTROLLING METHOD AND ITS PROGRAM FOR USE WITH PRESENCE SYSTEM

(75) Inventors: Naoko Ito, Tokyo (JP); Masafumi Watanabe, Tokyo (JP)

(73) Assignee: NEC Corporation, Tokyo (JP)

(*) Notice: Subject to any disclaimer, the term of this patent is extended or adjusted under 35 U.S.C. 154(b) by 171 days.

(21) Appl. No.: 12/361,919

(22) Filed: Jan. 29, 2009

(65) Prior Publication Data
US 2009/0138566 A1 May 28, 2009

Related U.S. Application Data

(62) Division of application No. 10/761,364, filed on Jan. 22, 2004, now Pat. No. 7,844,667.

(30) Foreign Application Priority Data

Jan. 22, 2003 (JP) ................................ 2003-013137
Jan. 28, 2003 (JP) ................................ 2003-019298
Mar. 5, 2003 (JP) ................................ 2003-057895

(51) Int. Cl.
*G06F 15/16* (2006.01)
*G06F 3/00* (2006.01)

(52) U.S. Cl. .......................... 709/206; 709/204; 715/751

(58) Field of Classification Search .................. 709/204, 709/206, 223, 224; 715/751–753; 726/4
See application file for complete search history.

(56) References Cited

U.S. PATENT DOCUMENTS 6,757,722 B2 * 6/2004 Lonnfors et al. ............... 709/220
2004/0059781 A1 * 3/2004 Yoakum et al. ............... 709/204

FOREIGN PATENT DOCUMENTS

| JP | 11-213291 A | 8/1999 |
|---|---|---|
| JP | 2000-4299 | 1/2000 |
| JP | 2000-167233 | 6/2000 |
| JP | 2000-287249 | 10/2000 |
| JP | 2001-167175 | 6/2001 |
| JP | 2001-313666 A | 11/2001 |
| JP | 2002-16696 A | 1/2002 |
| JP | 2002-73791 A | 3/2002 |
| JP | 2002-74164 A | 3/2002 |

(Continued)

OTHER PUBLICATIONS

Satoshi Okuyama: Instant messaging technology to support new mobile services. Fujitsu, Ltd., Jul. 13, 2001, vol. 52, No. 4, p. 262-p. 267. M. Day et al. "A Model for Presence and Instant Messaging," RFC—Request for Comments 2778.
A. Silver et al. "Unified Network Presence Management," White Paper Nortel Networks, 2000, pp. 1-6, XP002234868.

*Primary Examiner* — Peling A Shaw
(74) *Attorney, Agent, or Firm* — Sughrue Mion, PLLC

(57) ABSTRACT

A presentity service client has a presentity that issues presence information to a presence service and a watcher which observes presence information for other presentities; a presence change rule holding part holds a presence change rule; and a presence calculating part changes the presence information for the presentity, using as a trigger a change in presence information of other presentities, based on the presence information of other presentity acquired by the watcher and in accordance with the presence change rule held by a presence change rules holding part.

2 Claims, 16 Drawing Sheets

FOREIGN PATENT DOCUMENTS

| | | |
|---|---|---|
| JP | 2002-77456 | 3/2002 |
| JP | 2002-108814 | 4/2002 |
| JP | 2002-170032 A | 4/2002 |
| JP | 2002-168515 | 6/2002 |
| JP | 2002-368885 A | 12/2002 |
| JP | 2003-296525 A | 10/2003 |
| JP | 2004-030371 A | 1/2004 |
| JP | 2006-511853 A | 4/2006 |
| WO | 01-45342 A2 | 6/2001 |
| WO | 02-093959 A1 | 11/2002 |
| WO | 2004-008178 A3 | 1/2004 |

\* cited by examiner

PRESENCE SYSTEM AND INFORMATION PROCESSING EQUIPMENT, DYNAMIC BUDDY LIST GENERATION METHOD IN PRESENCE SYSTEM, AND PRESENCE NOTIFICATION DESTINATION CONTROLLING METHOD AND ITS PROGRAM FOR USE WITH PRESENCE SYSTEM

This is a Divisional Application of pending prior application Ser. No. 10/761,364 filed Jan. 22, 2004 which claims the priority of Japanese Patent Application No. 2003-013137 filed Jan. 22, 2003, Japanese Patent Application No. 2003-019298 filed Jan. 28, 2003 and Japanese Patent Application No. 2003-057895 filed Mar. 5, 2003.

BACKGROUNDS OF THE INVENTION

1. Field of the Invention

The present invention relates to a presence system, and more particularly, to a presence system that can change presence information for a presentity automatically by using as a trigger a change occurring in presence information for other presentity. The present invention also relates to a dynamic buddy list generation method in the presence system, and more particularly, to a dynamic buddy list generation method for automatically generating a buddy list in any desired form. Furthermore, the present invention relates to a presence system and a presence notification destination controlling method and its program for use therewith, and more particularly, to a presence system that incorporates a system and other means for managing the communication state of each user.

2. Description of the Related Art

It has become increasingly common to use buddy lists for ascertaining the states of different users on a network. One representative technology using buddy lists is the presence system.

The presence system refers to a type of system for managing the communication states of different users. Its basic architecture is defined in RFC2778 (Network Working Group Request for Comments: 2778). Japanese Patent Laying-Open (Kokai) No. 2002-16696 described below also gives an outline of a presence system.

The presence system consists of presentities, a watcher, and a presence service. A presentity provides own presence information (i.e., the state of the principal). A watcher observes presence information provided by presentities. The presence service receives presence information from presentities and delivers it to the watcher. There are two types of watcher: fetcher and subscriber. A fetcher requests the presence service to provide the current presence information for a particular presentity. A subscriber requests the presence service to notify whenever a change occurs in the presence information for a particular presentity. (For details, refer to, for example, "A Model for Presence and Instant Messaging," February 2000, in RFC (Request for Comments) 2778).

A typical conventional presence system requires users to set manually certain presence values (other than communication states, such as online and offline) that are associated with connections between a presence service client and a presence service. Relying on manual setting of these values by users is problematic in terms of the reliability of their presence information, since many users often forget updating their states.

In such a presence system, presence information is managed per individual user. This gives rise to another problem. When a user attempts to contact one of the members of a certain group, the user needs to check up the presence information for every member of the group. The user then must choose one member from those who are currently online, and transmit a message to that member. In addition, the user must always be aware of the member composition of each group on the network. Checking the presence information for every member of the group is an unreasonably onerous task for the user because the presence information he or she obtains can be for any member in the group. Also from the viewpoint of group members, there are privacy-related problems associated with disclosing their presence information unnecessarily to the user.

Many presence systems show the states of principals collected by their watchers in the form of a buddy list. A buddy list must be managed by each of the users of the presence service. This entails another problem. As the user continues to utilize the presence service, the number of communication partners increases, making the task of managing his or her buddy list increasingly burdensome. If the user wants to observe the states of different partners according to time of day, place and other context, the burden on the user becomes even greater because a buddy list must be prepared for each context.

A static buddy list presents other problems in addition to management burden. Suppose a user wants to have a buddy list for private use in addition to the existing one for business use. During off-duty hours, the user would use the new buddy list for contacting communication partners who are also not at work. The user is likely to encounter difficulties when preparing such a buddy list, because partners to be included in the private buddy list will stay in the list all the time, regardless of whether they are working or not. When using a conventional static buddy list, it is impossible for the user to create a state-specific buddy list.

Presently, it is not possible either to create a buddy list by restricting the current states of principals unless the user is aware of their URIs. One example of such a buddy list is one that shows taxis cruising near a prospective passenger based on location information. The number of taxis cruising in a town is by far too large for the passenger to identify the URI of every applicable taxi. Some conventional presence systems allow users to retrieve the URI of a principal using the name or e-mail address as a keyword. In this case, however large the number of users may be, the desired principals can be added to a buddy list from the name and address information. However, these system do not have a mechanism to retrieve URIs automatically based on a state. Representative technologies using buddy lists are disclosed in Japanese Patent Laying-Open (Kokai) No. 2002-074164 and No. 2002-170032, but neither of these solves the problems described above.

In presence systems, presentities, subscribers and presence services are all logical components. Some systems have a peer-to-peer configuration, wherein a server for a presence service is not needed when deploying these systems on networks. Others have a distributed configuration, wherein some presentity and subscriber functions are distributed between a client terminal and a server terminal. The present invention can be implemented in either configuration.

In a conventional presence service as described above, notification of a presence change is sent at a time to all the subscribers that are performing subscription; it is not possible for presentities to perform fine control of destinations of such notification.

For this reason, the conventional presence service may create inconveniences if a certain relationship will occur between a presentity and a subscriber according to the state of the presentity. If only a limited number of relationships can be processed at a time (for example, if a call starts as soon as a presentity goes online), there may appear some subscribers that are not able to establish a relationship with the presentity semipermanently.

There may be certain relationships that a user wants to give higher priority over others in processing, but conventional presence services typically have no mechanism to handle these relationships in a special manner. Furthermore, there is no mechanism in conventional presence services that allows a presentity to perform context-dependent control of destinations of notification based on its own state, time of day and so on.

SUMMARY OF THE INVENTION

An object of the present invention is to provide a presence system that can change presence information for a presentity automatically by using as a trigger changes occurring in presence information for one or more other presentities.

Another object of the present invention is to enable the presence information for a group to be provided, instead of the presence information for the individual members of the group.

An object of other aspect of the present invention is to provide a dynamic buddy list generation method, wherein a buddy list can be generated automatically according to the states of both the user owning the buddy list and other principals contained in the buddy list and wherein said buddy list is easier to see.

Another object of this other aspect of the present invention is to provide a dynamic buddy list generation method, wherein a user can generate a buddy list simply by setting conditions for adding principals in his or her buddy list.

An object of yet other aspect of the present invention is to provide dynamic buddy list generation method, wherein a user can generate a buddy list simply by setting conditions for adding principals in his or her buddy list Another object of this other aspect of the present invention is to provide dynamic buddy list generation method, wherein a buddy list can be generated automatically according to the states of both the user owning the buddy list and other principals contained in the buddy list; wherein said buddy list is easier to see; and wherein, even if a user is not particularly aware of URIs, the URIs of presentities needed by the server can be provided to the user by including them in a buddy list.

Yet another object of this other aspect of the present invention is to provide dynamic buddy list generation method, wherein a user can generate a buddy list simply by setting conditions for adding principals in his or her buddy list.

An object of yet other aspect of the present invention is to provide dynamic buddy list generation method, wherein a user can generate a buddy list simply by setting conditions for adding principals in his or her buddy list.

Another object of this other aspect of the present invention is to provide a presence system that can solve the above-described problems and that allows a presentity to perform fine control of destinations of state notification, and a presence notification destination controlling method and its program for use therewith.

In the present invention, the presence calculating part changes automatically the presence information for the presentities on a presence service client, using as a trigger changes in presence information for one or more other presentities. In addition, instead of providing the presence information for each of the members within a group of presentities on a presence service client, the presence information for the group as a whole is provided, by assuming a presentity on the presence service client to be a presentity belonging to a group of other presentities being observed by a watcher on the presence service client, and by having the presence calculating part calculate the presence information for the presentity of the group based on the presence information for the presentity of all the members within the group.

In other words, the presence system according to the present invention is based on an approach wherein, when a change occurs in the presence for a particular presentity, notification is not made to all the watchers that are monitoring the states of that presentity (hereinafter referred to as "subscribers"), but rather to the subscriber that satisfies specific conditions only. One example of such approach is to notify presence changes to the subscribers in a queue sequentially, from the top and downward.

This way, the presence system according to the present invention can guarantee that a presentity can communicate with all of the subscribers desiring to communicate with it, even when the presentity is actually communicating with one subscriber and the rest of the subscribers cannot communicate with the presentity.

According to the first aspect of the invention, a presence system, comprises a presence service client including a presentity that provides presence information and a watcher which observes presence information provided by other presentities than the presentity; a presence service which receives presence information from the presentity and delivers the presence information to the watcher; and a presence calculating part which changes the presence information for the presentity on the presence service client, using as a trigger a change in the presence information for other presentities acquired by the watcher on the presence service client.

According to another aspect of the invention, a presence system, comprises a presence service client including a presentity that provides presence information and a watcher which observes presence information for a plurality of other presentities than the presentity; a presence service which receives presence information from the presentity and delivers the presence information to the watcher; and a presence calculating part which changes the presence information for the presentity on the presence service client, based on the presence information calculated from the presence information for the plurality of other presentities that has been acquired by the watcher on the presence service client.

According to another aspect of the invention, an information processing equipment, comprises a presence service client including a presentity that issues own presence information to a presence service and a watcher which acquires from the presence service presence information for other presentities than the presentity; and a presence calculating part which changes the presence information for the presentity on the presence service client, using as a trigger a change in the presence information for the other presentities acquired by the watcher on the presence service client; wherein the presence calculating part further comprises a presence change rule storing part which holds a presence change rule that prescribes how the presence information for the presentity on the presence service client should be changed based on the presence information for the other presentities.

According to another aspect of the invention, an information processing equipment, comprises a presence service client including a presentity that issues own presence information to a presence service and a watcher which acquires from the presence service presence information for plurality of other presentities than the presentity; and a presence calculating part which changes the presence information for the presentity on the presence service client, based on the presence information calculated from the presence information for the plurality of other presentities acquired by the watcher on the presence service client; wherein the presence calculating part further comprises a presence change rule storing part which holds a presence change rule that prescribes how the presence information for the presentity on the presence service client should be changed based on the presence information for the other presentities.

According to another aspect of the invention, a presence notification destination controlling program, comprising the capabilities of making a computer function as a presence service client including a presentity that issues own presence information to a presence service and a watcher which acquires from the presence service presence information for other presentities than the presentity and a presence calculating part which changes the presence information for the presentity on the presence service client, using as a trigger a change in the presence information for the other presentities acquired by the watcher on the presence service client, in accordance with a pre-set presence change rule.

According to another aspect of the invention, a presence notification destination controlling program, comprising the capabilities of making a computer function as a presence service client including a presentity that issues own presence information to a presence service and a watcher which acquires from the presence service presence information for plurality of other presentities than the presentity and a presence calculating part which changes the presence information for the presentity on the presence service client, based on the presence information for the plurality of other presentities acquired by the watcher located on the presence service client and the presence information calculated from the pre-set presence change rule.

According to another aspect of the invention, a dynamic buddy list generation method for automatically generating a buddy list for use by each client on a network to manage state information for own client or other clients, wherein each client has a state managing part which stores state information A for own client; a state monitoring part which stores state information B for other clients and holds a buddy list (population list) that manages the state information B; a buddy list generating part which generates a buddy list (selection list) based on a given generation rule; and a buddy list managing part which holds the selection list, and comprises when a change occurs in the state of own client or any other client, first step wherein the state managing part updates and transmits the state information A to the buddy list generating part, second step wherein the state monitoring part transmits state notification request information which acquires the state after change to other clients included in the population list, and receives from other clients state change notification information in response to the state notification request information and the state information B, third step wherein the state monitoring part updates state information B being managed by the population list, based on the state change notification information, and transmits the population list to the buddy list generating part, fourth step wherein the buddy list generating part generates the selection list, based on the state information A received from the state managing part in the first step, the state information B being managed by the population list received from the state monitoring part in the third step, and the generation rule, and transmits the selection list to the buddy list managing part, and fifth step wherein the buddy list managing part holds the selection list received from the buddy list generating part in the fourth step.

According to another aspect of the invention, a dynamic buddy list generation method for automatically generating a buddy list for a server on a network to manage state information for each client, wherein each client includes a state managing part which stores state information C for own client and buddy list managing part which holds a buddy list (selection list) generated and transmitted by a server, wherein the server includes a state monitoring part which stores the state information C and holds a buddy list (population list) which manages the state information C, and a buddy list generating part which generates the selection list for each client based on the pre-set rule, and comprises when a change occurs in a state of any of the clients, sixth step wherein the state managing part updates the state information C, seventh step wherein the state monitoring part transmits state notification request information which acquires the state after change to other clients included in the population list, and receives from other clients state change notification information in response to the state notification request information and the state information C, eighth step wherein the state monitoring part updates state information C being managed by the population list, based on the state change notification information, and transmits the population list to the buddy list generating part, ninth step wherein the buddy list generating part generates the selection list for each client, based on the state information C being managed by the population list received from the state monitoring part in the eighth step and the generation rule, and transmits the selection list to the buddy list managing part of each client, and tenth step wherein the buddy list managing part holds the selection list received from the buddy list generating part in the ninth step.

According to another aspect of the invention, a presence system, comprises presentities that provide presence information indicating at least the state of own entity; subscribers that observe the presence information; and a presence service that delivers the presence information received from the presentities to the subscribers; wherein the presentities are provided with a notification part which notifies the presence information to specific subscribers only.

According to another aspect of the invention, a presence notification destination controlling method, wherein the method is a presence notification destination controlling method for a presence system comprising presentities that provides presence information indicating at least the state of own entity; subscribers that observe the presence information; and a presence service that delivers the presence information received from the presentities to the subscribers;

and comprising on the side of the presentities the step of notifying the presence information to specific subscribers only.

According to another aspect of the invention, a presence notification destination controlling program, wherein the program is a presence notification destination controlling program for a presence system comprising presentities that provides presence information indicating at least the state of own entity; subscribers that observe the presence information; and a presence service that delivers the presence information received from the presentities to the subscribers;

and comprising capabilities of having a computer execute a function of notifying the presence information to specific subscribers only.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
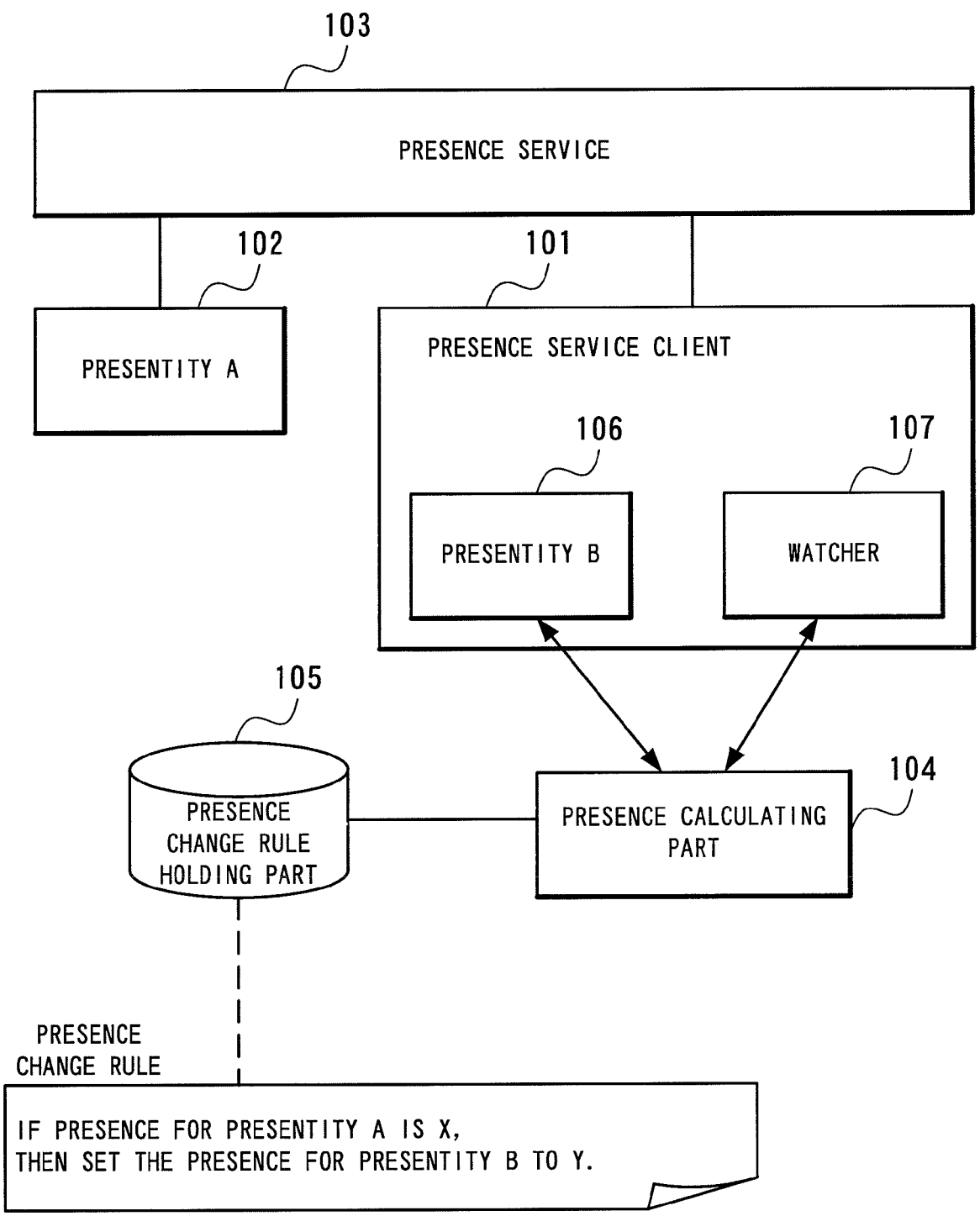
FIG. 1 is a block diagram for a presence system according to the first embodiment of the present invention.

As shown in FIG. 1, the presence system according to the first embodiment of the present invention comprises a presence service client 101 having a presentity B 106 and a watcher 107; other presentity 102; a presence service 103; a presence calculating part 104; and a presence change rule holding part 105.

The presence calculating part 104 is capable of calculating the value of the presence information for the presentity 106 on the presence service client 101, in accordance with the rules acquired from the presence change rules holding part 105 and based on the value of the presence information for the presentity 102 acquired from the watcher 107 on the presence service client 101, and then requesting the presentity 106 to change the presence value.

The presence change rules holding part 105 holds the rules pre-set by the user ("principal" as called in RFC2778), from which the presence information for the presentity 106 is derived. These presence change rules can take any form. One example is to require the own presence information to be changed to a pre-specified value when the presence information for other presentity matches a pre-specified value. For example, a presence change rule may be described in the form of "IF . . . THEN . . . ." In this case, the left term (IF . . . ) is a conditional expression for the presence value of the other presentity 102 being watched by the watcher 107. The right term (THEN . . . ) specifies to what value the own presence information for the presentity 106 should be changed. The content of this change would be as shown in the note to FIG. 1, that is, "IF the presence for Presentity A is X, THEN set the presence for Presentity B to Y."

Figure 2:
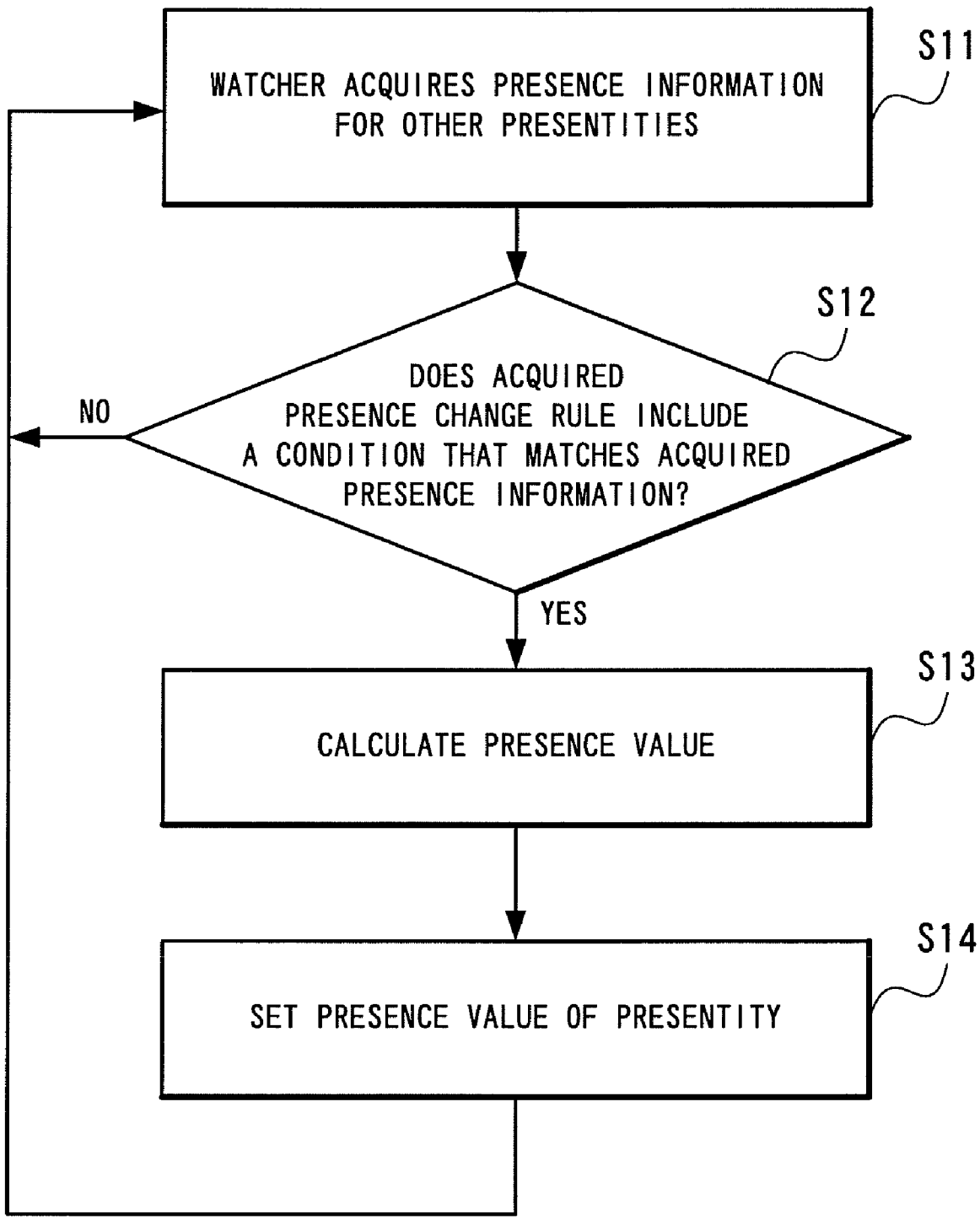
FIG. 2 is a flow chart showing an example of processing by a presence system according to the first embodiment of the present invention.

The operation of this embodiment will be described below, with reference to the configuration diagram of FIG. 1 and the flow chart of FIG. 2.

The watcher 107 on the presence service client 101 acquires the presence information for the other presentity 102 through the presence service 103 and passes it to the presence calculating part 104.

The presence calculating part 104 checks the presence change rules holding part 105 to determine whether or not it holds a presence change rule that contains in its left term the value of the presence information for the presentity 102 acquired by the watcher 107. If such rule is held, it acquires the change rule (S12). Otherwise, it does nothing and returns to Step S11.

If the change rule has been acquired, the presence calculating part 104 calculates the presence value of the presentity 106 in accordance with the content of the right term of the change rule (S13) and passes the resultant presence value to the presentity 106 to request a change.

The presentity 106 then sets its own presence information in the presence value that has been passed from the presence calculating part 104 (S14). The processing is returned to Step S11 again.

Thus, according to this embodiment, in the presence service client 101 having the presentity 106 and the watcher 107, the own presence information for the presentity 106 can be changed automatically, using as a trigger the presence information for the other presentity 102 acquired by the watcher 107. Suppose, for example, that the presence service client 101 is the client of a user and the presentity 102 is a presentity relating to an event, such as a meeting included in the schedule for that user. In this case, this embodiment enables the presence for the user to participate in the event to be changed automatically according to the presence (e.g., commencement or termination) of the event.

(Concrete Example of the First Embodiment)

A concrete example of the first embodiment will now be described. In this example, the presence service client 101 in FIG. 1 is assumed to be the client of a user, and the presentity 102 to be the presentity of a meeting to be participated by the user.

Figure 3:
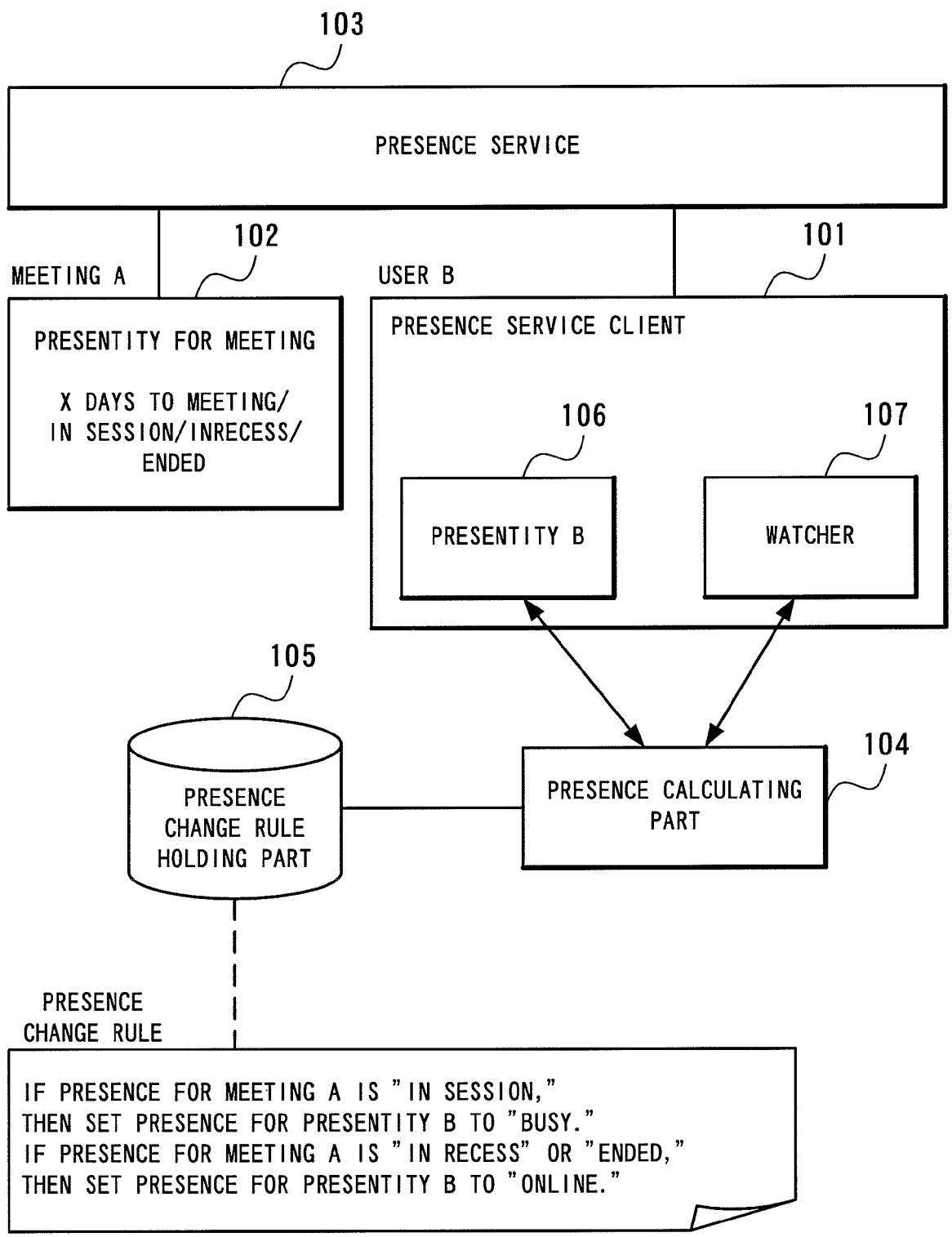
FIG. 3 is a block diagram for a presence system according to a concrete example of the first embodiment of the present invention.

As shown in FIG. 3, the presence system in this concrete example comprises the presence service client 101 for User B; the presentity 102 associated with Meeting A to be participated by User B; the presence service 103; the presence calculating part 104; and the presence change rules holding part 105. The presence service client 101 further comprises the presentity 106 and the watcher 107.

As the presence for Meeting A, the presentity 102 relating to Meeting A issues to the presence service 103 one of the states as appropriate, i.e., "X days to meeting," "In session," "In recess," or "Ended," by means of, for example, manual entry by the organizer of the meeting.

As its own presence, the presence service client 101 of User B issues to the presence service 103 one of the states as appropriate, i.e., "Online," "Offline," or "Busy," using its own presentity 106.

As given in the note to FIG. 3, the presence change rules holding part 105 holds a presence change rule indicating that the presence for User B should be changed using as a trigger a change in the presence for Meeting A.

Suppose Meeting A is yet to be held but the presence for Meeting A is "0 days to meeting" and that the presence for User B is "Online."

When Meeting A begins, the presentity of Meeting A issues to the presence service 103 "In session" as the presence for the meeting.

The watcher 107 of User B is notified by the presence service 103 that the presence for Meeting A has changed to "In session," and forwards this notification to the presence calculating part 104.

The presence calculating part 104 acquires from the presence change rules holding part 105 a presence change rule that uses as a trigger the "In session" state of the presence for Meeting A, i.e., IF the presence for Meeting A is "In session," THEN set the presence for Presentity B to "Busy."

In accordance with the change rule thus acquired, the presence calculating part 104 requests the presentity 106 to change the presence for User B to "Busy."

Following this request, the presentity 106 of User B changes its presence to "Busy."

Later, when Meeting A recesses or ends, the presentity of Meeting A issues to the presence service 103 "In recess" or "Ended" as applicable as the presence for the meeting.

The watcher 107 of User B is notified by the presence service 103 that the presence for Meeting A has changed to "In recess" or "Ended," and forwards this notification to the presence calculating part 104.

The presence calculating part 104 acquires from the presence change rules holding part 105 a presence change rule that uses as a trigger the "In recess" or "Ended" state of the presence for Meeting A, i.e., IF the presence for Meeting A is "In recess" or "Ended," THEN set the presence for Presentity B to "Online."

In accordance with the change rule thus acquired, the presence calculating part 104 requests the presentity 106 to change the presence for User B to "Online."

The presentity 106 of User B changes its presence to "Online."

Thus, this embodiment can change the presence for a user automatically according to the context, such as the commencement of a meeting, thereby eliminating the effort on the part of the user to set his or her own presence and also making the presence for the user more reliable than when relying on the user to change it manually. Moreover, this embodiment extends the use of the presence service to include notification of context changes, which allows the context and the presence information of a user to be linked more easily when compared with using a location sensor or other means for detecting the movement of the user.

In FIGS. 1 and 3, it is not necessary to provide one presence calculating part 104 and one presence change rules holding part 105 for use with each presence service client 101. Instead, more than one presence service client may share the presence calculating part 104 and/or the presence change rules holding part 105.

Second Embodiment

Figure 4:
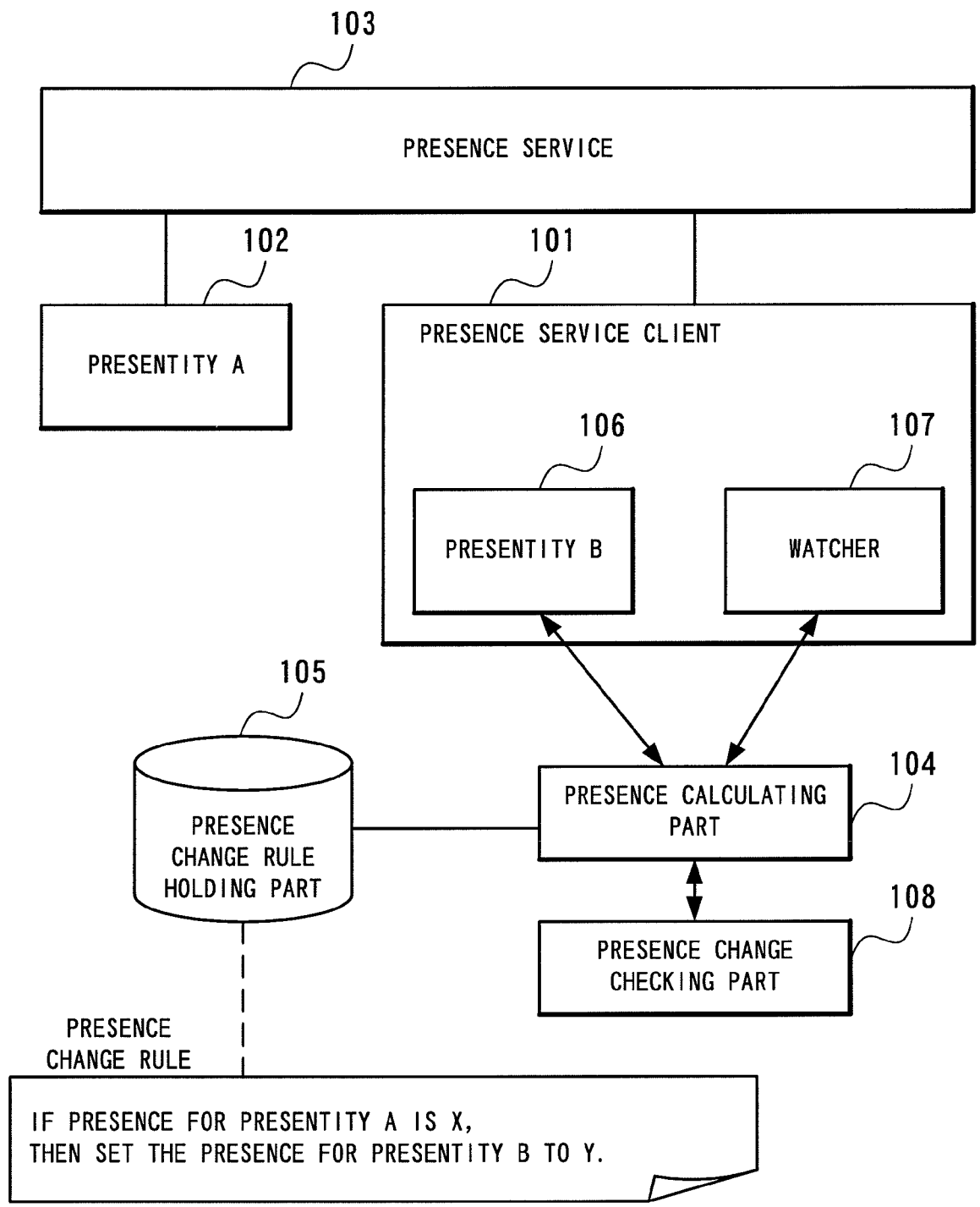
FIG. 4 is a block diagram for a presence system according to the second embodiment of the present invention.

Reference to FIG. 4 reveals that the presence system according to the second embodiment of the present invention is similar to the first embodiment shown in FIG. 1, except in that the presence calculating part 104 has a presence change checking part 108 connected to it.

The presence change checking part 108 is a unit for inquiring a user on the presence service client 101 before the presence calculating part 104 issues a change request to the presentity 106 on the presence service client 101, to check if the presence may be changed or not. This inquiry may be made using any method. One possible method is to receive the calculated presence value from the presence calculating part 104 and then to prompt the user to confirm a change to that presence value on the display of the computer incorporating an implementation of the presence service client 101. If the unit receives a response from the user that expressly accepts or rejects the change, and if the response is affirmative, the unit notifies this result to the presence calculating part 104 to make it send a change request to the presentity 106. If rejected, the unit makes the presence calculating part 104 cancel the presence change request. If a pre-determined length of time passes without receiving any response from the user, the unit assumes that the user has accepted the change and cause the processing to take place accordingly.

In the concrete example of the first embodiment described above, the presence for the user is changed "automatically" when the presence for the meeting is changed. However, there may be cases where the user is not present in the meeting at the time of commencement for some reasons. In these cases, changing the presence for the user automatically may impair the reliability of the presence information for the user rather than improving it. This embodiment solves this problem by having the presence change checking part 108 inquire the user to check if the user wants the presence information for the user to be changed before actually changing the presence for the user. Furthermore, in cases where the presentity 102 that serves as a trigger for changing the presence information for the user relates to the user's schedule for meetings, the presence change checking part 108 will also serve as a memorandum book by issuing an inquiry to the user.

(Concrete Example of the Second Embodiment)

Figure 5:
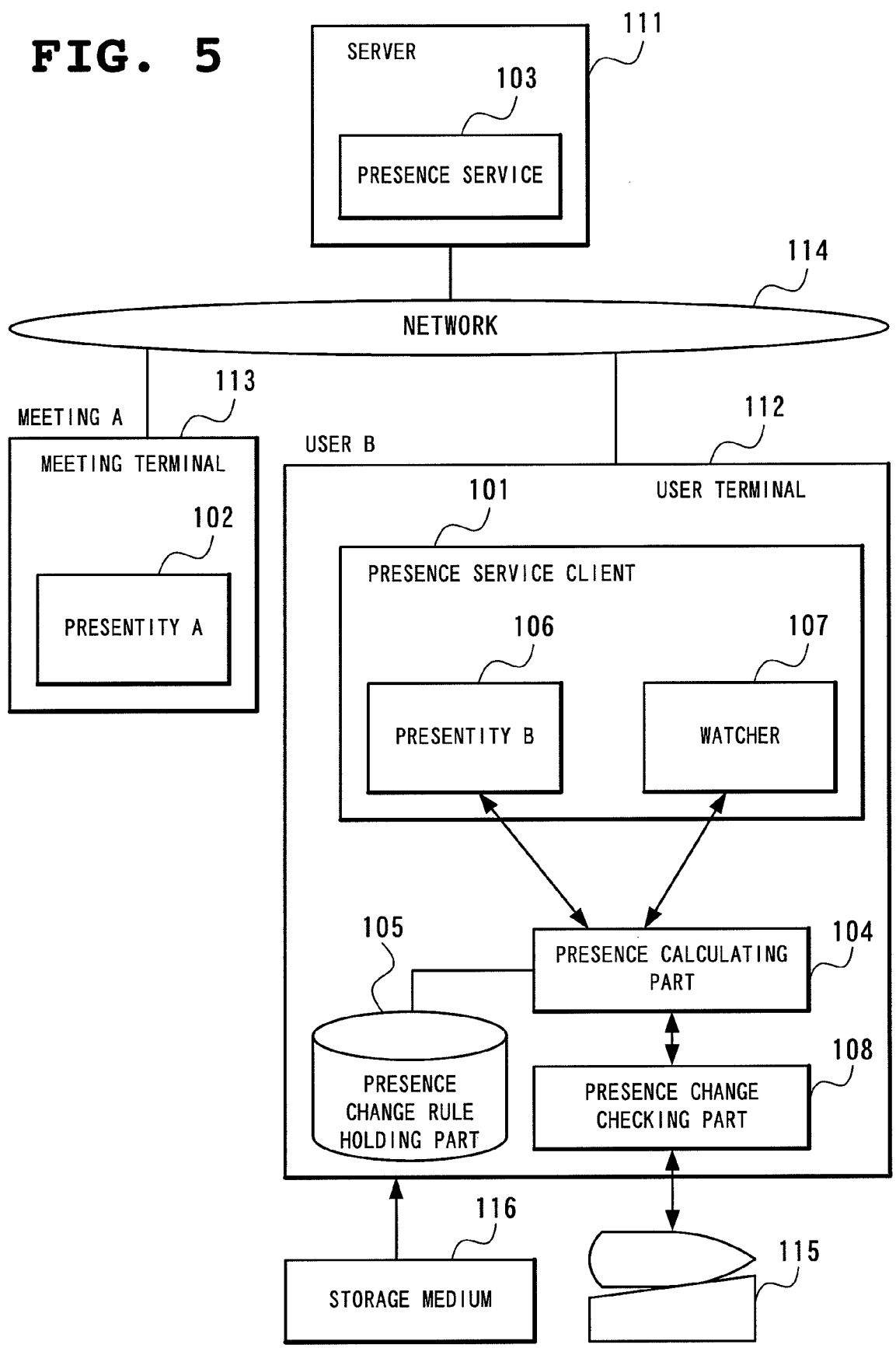
FIG. 5 is a block diagram for a presence system according to a concrete example of the second embodiment of the present invention.

In this concrete example, as shown in FIG. 5, a server 111, a user terminal 112, and a meeting terminal 113 are connected with each other through a network 114, such as a LAN, a WAN or the Internet. The user terminal 112 is provided with a presence service client 101 for User B that has a presentity B 106 and a watcher 107; a presence calculating part 104; a presence change checking part 108; and a presence change rule holding part 105. The meeting terminal 113 is provided with a presentity 102 relating to Meeting A in which User B participates. The server 111 is provided with a presence service 103.

The meeting terminal 113 and the server 111 consist of information processing equipment, such as a personal computer, respectively. The user terminal 112 consists of information processing equipment, such as a personal computer or a cellular information terminal, to which input/output equipment 115 that includes a keyboard, a display and other peripherals and a computer-readable recording medium 116, such as a CD-ROM or a magnetic disc, are connected. The recording medium 116 stores a program for the user terminal and presence change rules. The program stored in the recording medium 116 is read by a computer that makes up the user terminal 112. By controlling the operation of this computer, the presence service client 101, the presence calculating part 104 and the presence change checking part 108 are implemented in the computer. The presence change rules stored in the recording medium 116 are set in the presence change rules holding part 105 that consists of a main memory and/or an auxiliary memory.

While a concrete example of the second embodiment is configured as shown in FIG. 5, a concrete example of the first embodiment is configured similarly to this, except that the presence change checking part 108 is omitted. In FIG. 5, the presence calculating part 104 and the presence change rules holding part 105 are provided in the same user terminal 112 as the presence service client 101. However, as described above, it is possible to have multiple presence service clients share both or either of the presence calculating part 104 and/or the presence change rules holding part 105. In this case, the configuration to be adopted may be such that the presence calculating part 104 and the presence change rules holding part 105 to be shared are provided on a server 111 connected to a network 114 or otherwise in a separate computer.

Third Embodiment

Figure 6:
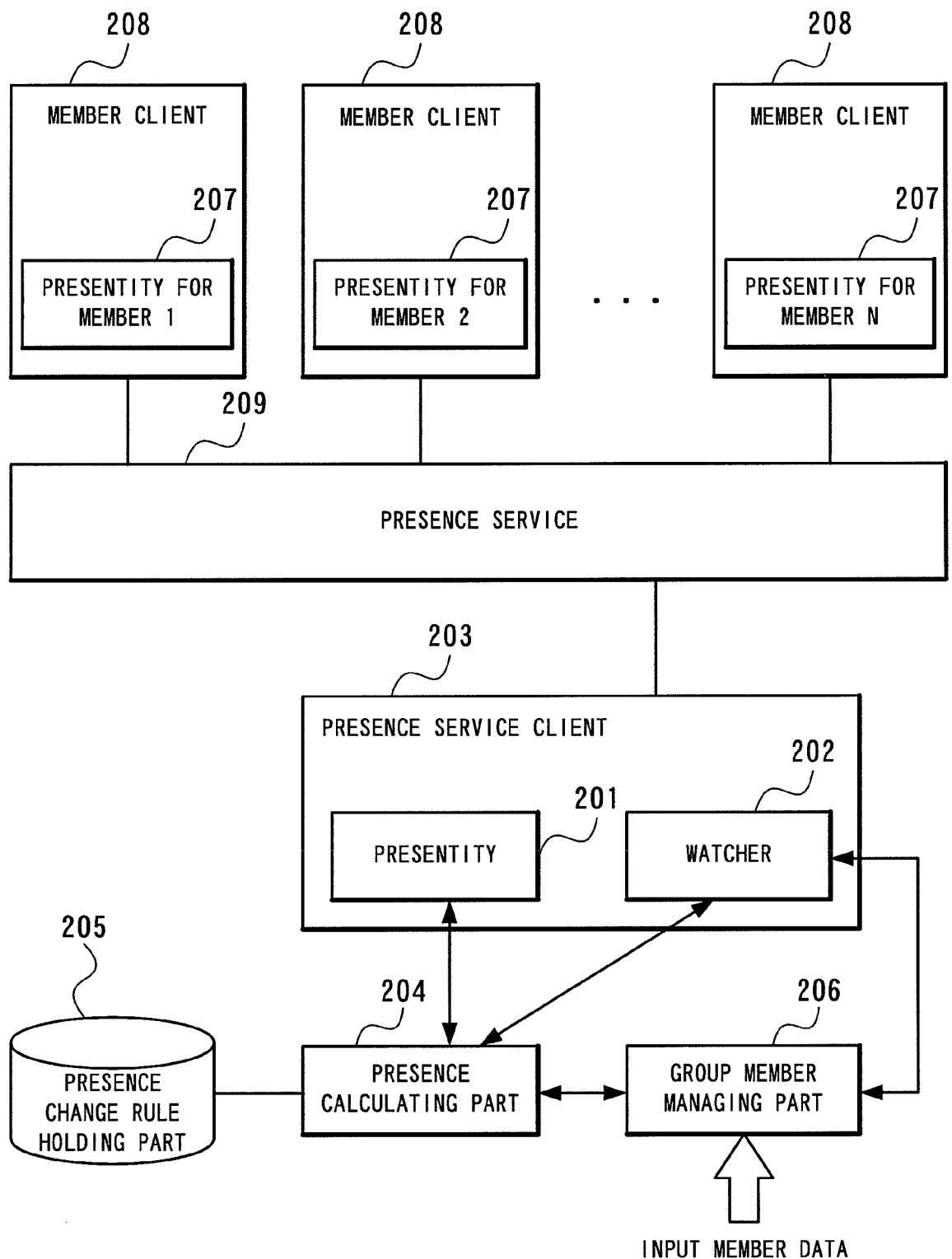
FIG. 6 is a block diagram for a presence system according to the third embodiment of the present invention.

As shown in FIG. 6, a presence system according to the third embodiment of the present invention comprises a presence service client 203 associated with a certain Group G; a presence calculating part 204; a presence change rule holding part 205; a group member managing part 206; a member client 208 that includes a presentity 207 for each of the members of said Group G; and a presence service 209.

The presence service client 203 has a presentity 201 and a watcher 202, and operates as a client for the presence service.

The presentity 201 provides the presence given by the presence calculating part 204 to the presence service 209 as its own presence.

For each of the members of Group G given by the group member managing part 206, the watcher 202 acquires the presence for the presentity 207 from the presence service 209 and provides it to the presence calculating part 204. The watcher 202 includes a fetcher and a subscriber. If the presence provided by the presentity 201 is "Offline," it uses the fetcher to acquire the presence for the member. If the presence provided by the presentity 201 is "Online," it uses the subscriber to receive a notification of the presence for the member.

The group member managing part 206 notifies the watcher 202 of the members belonging to Group G whose presences should be monitored. The group member managing part 206 may also be given capabilities to manage the membership (create member, add, modify, delete and so on), based on a request from the user or program that is authorized to determine the member composition of Group G.

The presence calculating part 204 is capable of calculating the value of the presence information for the presentity 201 on the presence service client 203, in accordance with the rules acquired from the presence change rules holding part 205 and based on the presence value for the presentity 207 of the group members acquired from the watcher 202 on the presence service client 203, and then requesting the presentity 201 to change the presence value.

The presence change rules holding part 205 holds the rules for use by the presence calculating part 204, from which the presence information for the presentity 201 is derived. Similarly to the first embodiment, the presence change rules may be in "IF . . . THEN . . . " form. In this case, the left term (IF . . . ) is a conditional expression for the presence value of the other presentity 207 being watched by the watcher 202. The right term (THEN . . . ) specifies to what value the own presence information for the presentity 201 should be changed. A presence change rule may be an arithmetic expression, such as logical OR or AND. In this case, the presence calculating part 204 returns the results of performing an arithmetic operation to obtain the presences for all the group members that it has received from the watcher 202, based on the given arithmetic expression. Presence change rules will be assumed hereafter to be arithmetic expressions.

Figure 7:
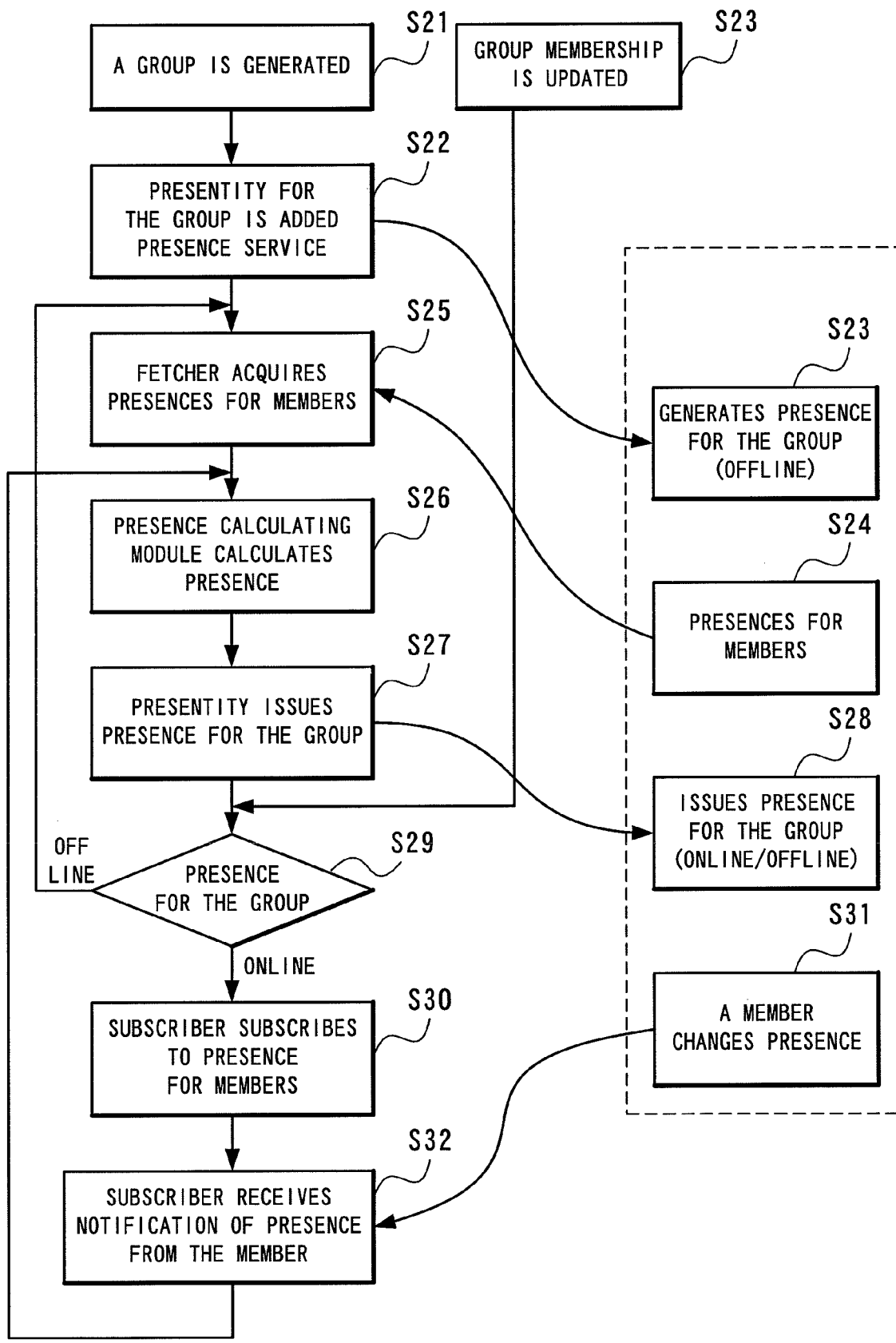
FIG. 7 is a flow chart showing an example of processing by a presence system according to the third embodiment of the present invention.

The operation of this embodiment will be described below, with reference to the configuration diagram of FIG. 6 and the flow chart of FIG. 7.

When a user authorized to determine the member composition of Group G creates in the group member managing part 206 a composition of group members consisting of the users who are providing their presences to the presence service 209, the group member managing part 206 generates a presence service client 203 for Group G that includes a presentity 201 and a watcher 202 (S21, S22). The presentity 201 on the presence service client 203 stores "Offline" in the presence service 209 as the presence for Group G (S23).

The watcher 202 on the presence service client 203 for Group G acquires a list of members of Group G from the group member managing part 206, uses the fetcher to request the presence service 209 to provide the current presence for each member, and passes the presence for each member thus acquired to the presence calculating part 204 (S24, S25).

The presence calculating part 204 performs an arithmetic operation to obtain the presences for the members acquired by the watcher 202, based on the arithmetic expression fetched from the presence change rules holding part 205 and then calculates the presence value of the presentity 201 (S26), and passes the results to the presentity 201.

The presentity 201 issues the presence value given by the presence calculating part 204 to the presence service 209 as its own presence (S27, S28). However, if the presence value passed from the presence calculating part 204 is the same as the previous presence value, the presentity 201 does not issue the presence.

The presence service client 203 determines whether the presence value issued in Step S27 is "Offline" or "Online" (S29). If the presence value is "Offline," it waits for a predetermined length of time and returns to Step S25 in order to re-acquire the current presence for each member from the presence service 209.

If the presence value issued in Step S27 is "Online," the presence service client 203 uses the subscriber of the watcher 202 to request the presence service 209 to perform a subscription for the members acquired from the group member managing part 206 (S30). Upon receiving a presence change notification from the member to which it has subscribed (S31), the presence service client 203 returns to Step S26 in order to re-calculate the presence value of the presentity 201 by reflecting the changed presence value (S32). The presence value of each member of Group G to be passed from the watcher 202 to the presence calculating part 204 is different, depending on whether or not the member has received a change notification; the value after change will be passed if the member has received a change notification, and the original value will be passed if the member has not received a change notification.

If information indicating a change in the members of Group G is entered by the user in the middle of processing, the group member managing part 206 notifies a modified list of members to the watcher 202 (S33). If the presence for Group G is "Online," the watcher 202 uses the subscriber to subscribe to the members acquired from the group member managing part 206 (S30), followed by the processing as shown in the procedure of FIG. 7. If the presence for Group G is "Offline," the watcher 202 uses the fetcher to request the presences for the members acquired from the group member managing part 206 (S25), followed by the processing as shown in the procedure of FIG. 7.

Thus, according to this embodiment, the presence service client 203 for Group G that has a presentity 201 and a watcher 202 can determine the presence information for the presentity 201 for Group G from the presence information for the presentity 207 for all the members of Group G acquired by the watcher 202. Therefore, it becomes possible to provide presences using a new method that has never been used in conventional arts, for example, by providing the presence for Group G instead of providing the presence for each member of the group to a third party.

(Concrete Example of the Third Embodiment)

Figure 8:
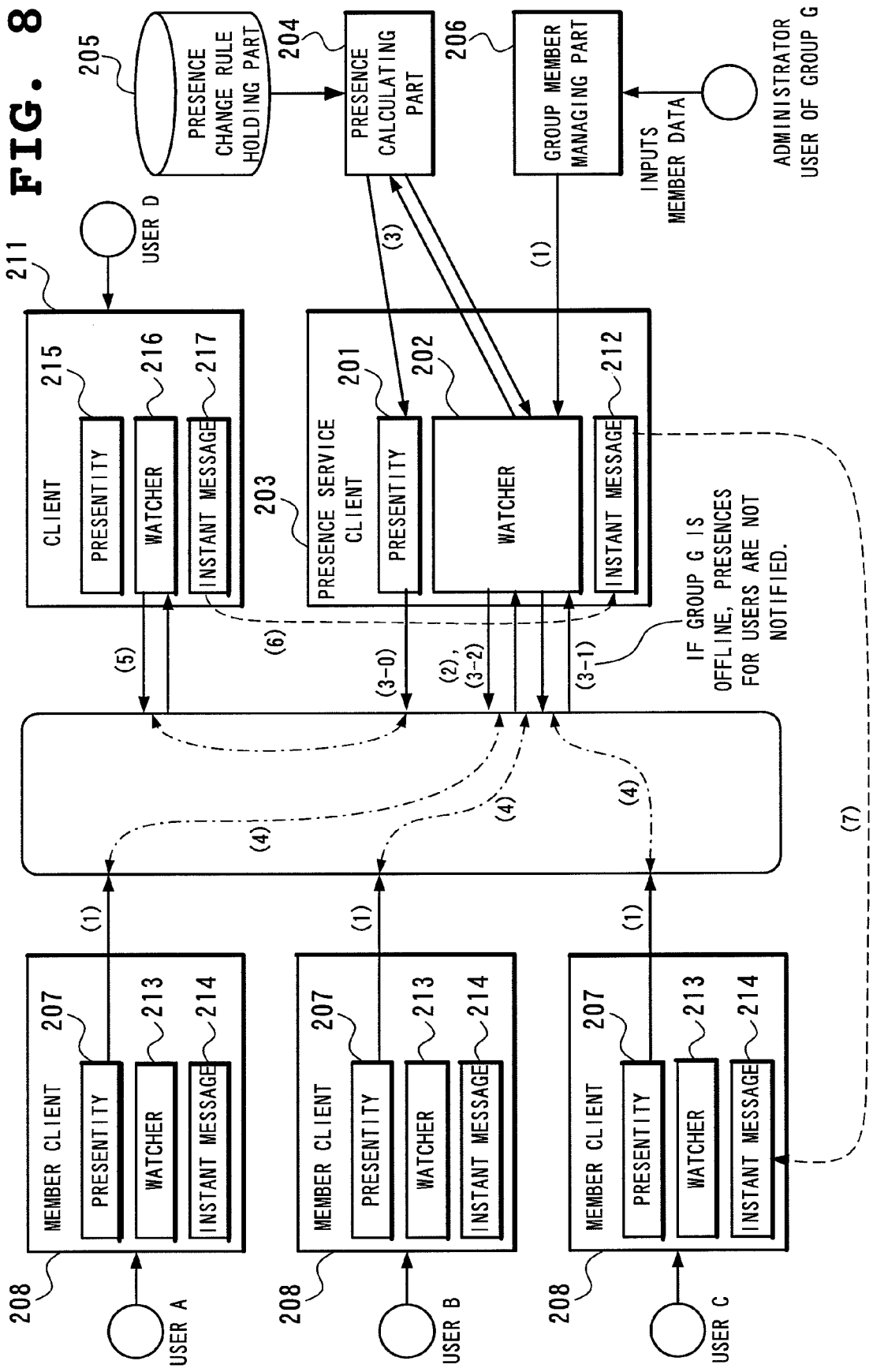
FIG. 8 is a block diagram for a presence system according to a concrete example of the third embodiment of the present invention.

A concrete example of the third embodiment of the present invention will now be described. As shown in FIG. 8, a presence system according to this concrete example comprises a presence service client 203 associated with a certain Group G; a presence calculating part 204; a presence change rule holding part 205; a group member managing part 206; member clients 208 for each Users A, B and C, who are the members of said Group G; a client 211 of User D interested in Group B; and a presence service 209. The presence service client 203 has an instant message 212, in addition to a presentity 201 and a watcher 202. The member client 208 has a watcher 213 and an instant message 214, in addition to a presentity 207. The client 211 has a presentity 215, a watcher 216 and an instant message 217. The basic architecture of the instant message is defined in RFC2778.

The operation of this concrete example will be described below, with reference to the configuration diagram of FIG. 8 and the flow chart of FIG. 7. In the descriptions below, we will use as a presence change rule an arithmetic expression for obtaining OR for presences for all the members in a group. In this case, if all the member have a presence of "Offline," the operation will result in "Offline." If at least one member has a presence of "Online," the operation will result in "Online."

When an administrator user authorized to determine the member composition of Group G creates in the group member managing part 206 a new composition of group members consisting of Users A, B and C who are providing their presences to the presence service 209, the group member managing part 206 generates a presence service client 203 for Group G that includes a presentity 201 and a watcher 202 (S21, S22). The presentity 201 on the presence service client 203 stores "Offline" in the presence service 209 as the presence for Group G (S23).

The watcher 202 on the presence service client 203 for Group G acquires a list of members of Group G ((1) in FIG. 8) from the group member managing part 206, uses the fetcher to request the presence service 209 to provide the current presence for each Users A, B, and C ((2) in FIG. 8), and passes the presence for each user thus acquired to the presence calculating part 204 (S24, S25).

Using the arithmetic expression fetched from the presence change rules holding part 205, the presence calculating part 204 calculates OR for the presences for Users A, B and C acquired by the watcher 202, and passes the results of this OR operation to the presentity 201 as the presence value of the presentity 201 (S26) ((3) in FIG. 8).

The presentity 201 issues the presence value given by the presence calculating part 204 to the presence service 209 as its own presence (S27, S28) ((3-0) in FIG. 8). However, if the presence value passed from the presence calculating part 204 is the same as the previous presence value, the presentity 201 does not issue the presence.

The presence service client 203 determines whether the presence value issued in Step S27 is "Offline" or "Online" (S29). If the presence value is "Offline," it waits for a predetermined length of time and returns to Step S25 in order to re-acquire the current presences respectively for Users A, B and C from the presence service 209 ((3-2) in FIG. 8).

If the presence value issued in Step S27 is "Online," the presence service client 203 uses the subscriber of the watcher 202 to request the presence service 209 to perform a subscription for Users A, B and C (S30, (3-1) in FIG. 8). Upon receiving a presence change notification from Users A, B and C, to which it has subscribed (S31, (4) in FIG. 8), the presence service client 203 returns to Step S26 in order to re-calculate the presentity 201 by reflecting the changed presence values (S32).

Suppose User D is interested in Group G and, hoping to contact a member of Group G, is subscribing to this group through access from the watcher 216 to the presence service 209 ((5) in FIG. 8). If the presence for Group G received from the presence service 209 is "Online," User D uses its instant message 217 and contacts Group G by sending a message to the instant message 212 of the presence service client 203 ((6) in FIG. 8). If the presence for Group G is "Offline," User D waits until it changes to "Online."

Upon receiving the message from User D through its instant message 212, the presence service client 203 for Group G forwards it to the instant message 214 of any user among Users A, B and C whose presence is "Online" ((7) in FIG. 8).

Thus, according to this concrete example, even when User D is not aware of the member composition of Group G or the presence information for each member of Group G, User D can satisfy easily his or her desire to contact any member of Group G by utilizing the presence information for Group G as a whole. Disclosing presence information for Group G only also leads to the protection of privacy of each member of Group G, because the member composition of Group G is not made known and the members do not disclose their presences to the watcher 216 of User D. It is of course possible for each member of Group G to disclose his or her presence as a private person to any watchers that he or she permits.

The presence service client 203 for Group G can issue its own presence or request the presences of other users to and from an ordinary presence service 209, which means that the ordinary presence service is available to the client whenever appropriate. Furthermore, Users A, B and C can reflect their own presences in the presence for Group G simply by disclosing their presence information through the client 208 for the ordinary presence service. If a change occurs in Group G, the client 208 for each member of the group does not have to be modified.

While, in the descriptions of the operation above, User D sends a message to Group G through its instant message in order to contact any of the users belonging to Group G, and Group G forwards the message to a user whose presence is "Online," different ways of contacting desired users are also available. For example, the instant message 212 for Group G may forward the message received from User D to all the members of Group G. If User D is aware of the e-mail addresses of the members of Group G, another forwarding method would be sending e-mail to the mailing list that includes the members of Group G.

While this concrete example uses an OR arithmetic expression as a presence change rule, it is also possible to use an AND arithmetic expression for this purpose. An AND arithmetic expression would be convenient when User D wants to contact when all the members are online because the presence of Group G becomes "Online" only if all the members are online. In this case, possible methods that User D can use in addition to the methods possible with an OR expression when contacting the members include delivering an instant message to any user and making a call to any user. Also possible is to use a compound AND arithmetic expression. For example, User D can first get an AND between User A and User B and then an OR between the result and User C.

Presence information to be grouped does not have to be limited to presences for individuals. Using the results of grouping as inputs for another group, one can manage presence information in a hierarchical manner. Furthermore, presence information to be handled by a presence service does not have to be limited to communication states for individuals. Presence information may be extended to include operation states for equipment and other kinds of states. When operation states for equipment are included in presence information, it would become possible to be alerted for equipment in a faulty condition.

In FIGS. 6 and 8, it is not necessary to provide one presence calculating part 204 and one presence change rules holding part 205 for each presence service client 203. Instead, more than one presence service client may share the presence calculating part 204 and/or the presence change rules holding part 205.

(Another Concrete Example of the Third Embodiment)

Figure 9:
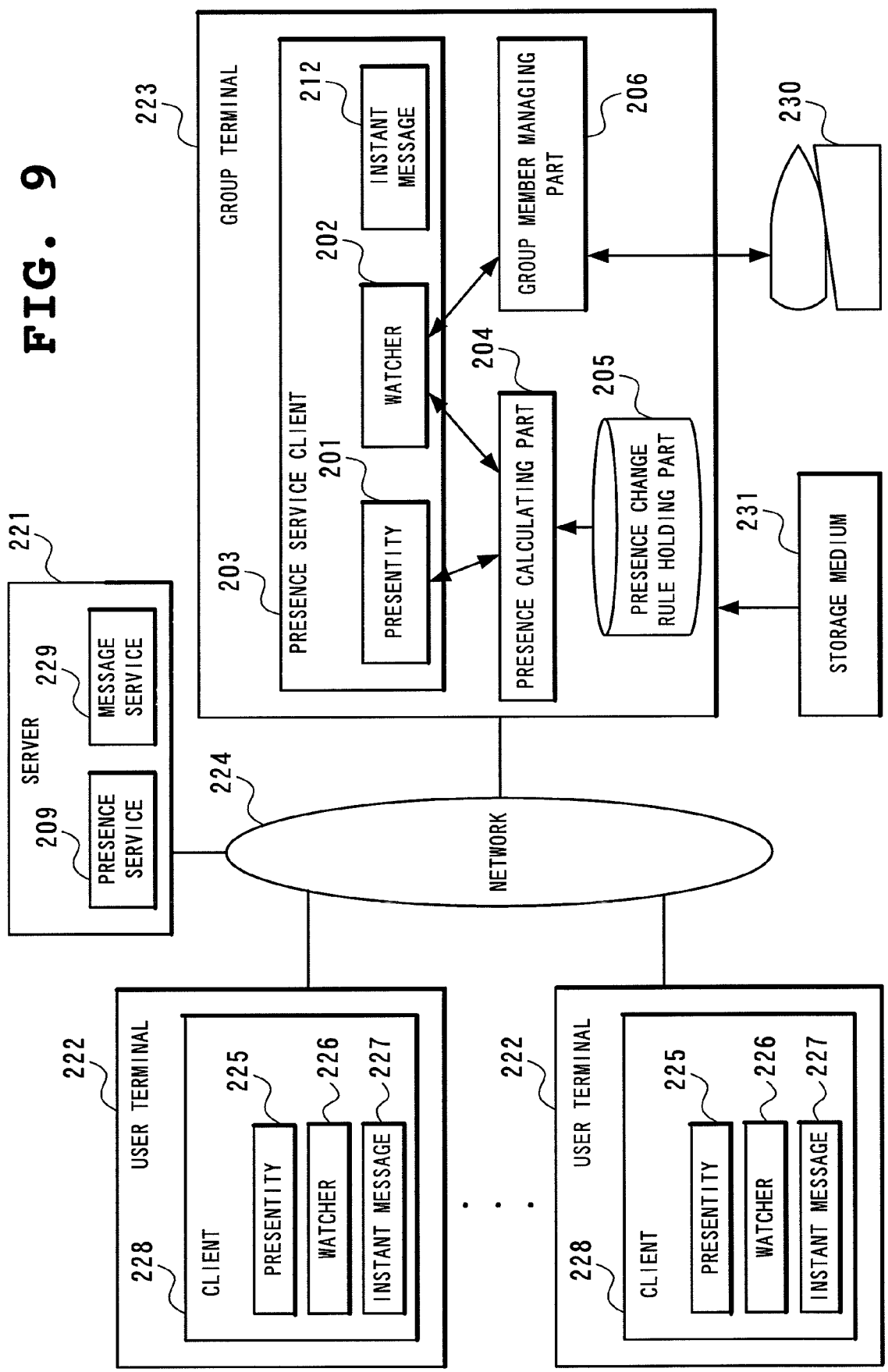
FIG. 9 is a block diagram for a presence system according to another concrete example of the third embodiment of the present invention.

In this concrete example, as shown in FIG. 9, a server 221, a plurality of user terminals 222 and a group terminal 223 are connected with each other through a network 224, such as a LAN, a WAN or the Internet. The group terminal 223 is provided with a presence service client 203 for Group G that comprises a presentity 201, a watcher 202 and an instant message 212; a presence calculating part 204; a presence change rule holding part 205; and a group member managing part 206. Each of the user terminals 222 is provided with a client 228 that comprises a presentity 225, a watcher 226 and an instant message 227. The server 221 is provided with a presence service 209 and a message service 229.

The server 221 consists of information processing equipment, such as a personal computer. The message service 229 in the server 221 provides a service to deliver messages sent from the instant messages 227, 212 of the user terminal 222 and the group terminal 223 to the instant messages 227, 212 of other user terminals 222 and group terminals 223. Each user terminal 222 consists of information processing equipment, such as a personal computer or a cellular information terminal, for use by Users A, B, C and D in FIG. 8.

The group terminal 223 consists of information processing equipment, such as a personal computer, to which input/output equipment 230 that includes a keyboard, a display and other peripherals and a computer-readable recording medium 231, such as a CD-ROM or a magnetic disc, are connected.

The recording medium 231 stores a program for the user terminal and presence change rules. The program stored in the recording medium 231 is read by a computer that makes up the group terminal 223. By controlling the operation of this computer, the presence service client 203, the presence calculating part 204 and the group member managing part 206 are implemented in the computer. The presence change rules stored in the recording medium 231 are set in the presence change rules holding part 205 that consists of a main memory and/or an auxiliary memory.

In FIG. 9, the presence calculating part 204 and the presence change rules holding part 205 are provided in the same group terminal 223 as the presence service client 203. However, as described above, it is possible to have multiple presence service clients 203 share both or either of the presence calculating part 204 and/or the presence change rules holding part 205. In this case, the configuration to be adopted may be such that the presence calculating part 204 and the presence change rules holding part 205 to be shared are provided on a server 221 connected to a network 224 or otherwise in a separate computer. While in FIG. 9 the presence service client 203 is provided on the group terminal 223, the presence service client 203 may be provided on the server 221. Alternatively, certain components (for example, the watcher 202) of the presence service client 203 may be provided on the server 221, with the rest of the components located on the group terminal 223.

As is clear from the foregoing, a number of effects can be achieved from the present invention (the first to third embodiments) as described below.

Presence information for a presentity on a presence service client can be changed automatically by using as a trigger changes occurring in presence information for one or more other presentities. This is because the presence calculating part changes automatically the presence information for the presentities on a presence service client, using as a trigger changes in present information for one or more other presentities.

The presence information for a group can be provided, instead of the presence information for the individual members of the group. The reason for this is that the presence information of a presentity for the group as a whole is provided, by assuming a presentity on the presence service client to be a presentity belonging to a group of other presentities being observed by a watcher on the presence service client, and by having the presence calculating part calculate the presence information of a presentity for the group based on the presence information of a presentity for all the members within the group.

The fourth embodiment of the present invention will now be described with reference to the drawings. While the descriptions of this embodiment will be given in relation to a dynamic buddy list generation method in a presence system, it should be noted that the scope of the present invention is not restricted to presence systems.

(Configuration of the Fourth Embodiment)

Figure 10:
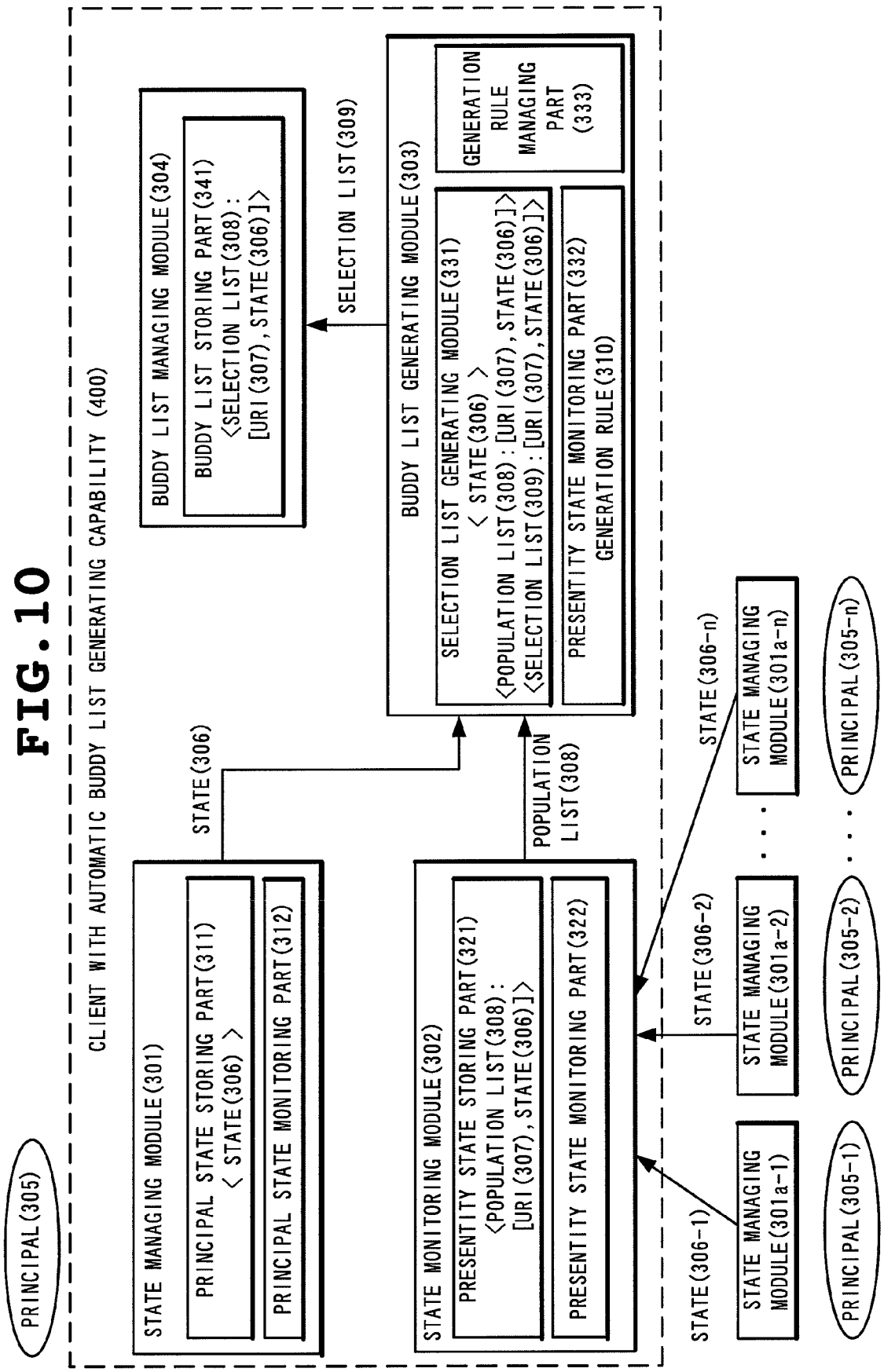
FIG. 10 is a configuration diagram for the fourth embodiment of the present invention.

The Configuration of the Fourth Embodiment of the present invention is shown in FIG. 10. The fourth embodiment comprises a client with automatic buddy list generating capability (400) and a state managing module belonging to other client (301a). The client with automatic buddy list generating capability (400) further comprises a state managing module (301), a state monitoring module (302), a buddy list generating module (303), and a buddy list managing module (304). All clients are connected with each other via a network.

However, clients may not necessarily be connected to a network.

The state managing module (301) collects and stores the states of principals (305). When the state of a principal changes, the state (306) stored in the principal state storing part (311) is changed and issued to the buddy list generating module (303). The state of a principal is stored in the principal state storing part (311). The monitoring and collection of the states of principals are performed by the principal state monitoring part (312). The state managing module belonging to other client (301a) issues the states (306) to the state monitoring module (302) over the network.

A state appearing in the description above is expressed using various attributes. Examples of attribute that can be used for defining a state include availability for communication indicated by "Online" or "Offline"; location indicated by a latitude and a longitude; personal intention or desire, such as "Want to take a taxi" or "Want to take a train"; personal feeling, such as "Hot," "Cold" or "Pleasant." For example, the state of one principal may be expressed as "Online, Hot," while the state of another as "Online, Want to take a taxi, Cold." In managing states, the presence service handles attribute values that describe a principal from different aspects as a state.

This embodiment uses two types of buddy list: population list (308) and selection list (309). A buddy list has principals' URIs (307) as its entity. In addition to a principal's URI (307), entities in a buddy list may hold one or more kinds of state (306) of a principal. A population list (308) is a buddy list held by the state monitoring module (302). A selection list (309) is generated by the buddy list generating module (303) and held by the state providing module (304), and displayed on the screen via a GUI or other means.

The state monitoring module (302) issues a state notification request to one or more principals (305-$i$)($1 \leq i \leq n$) included in the population list (308) (this is referred to as "subscribing"), receives a state change notification, and upon receiving a state (306) issued by the state managing module (301a), updates the state that it holds internally. The presentity state storing part (321) within the state monitoring module (302) holds the states of principals (305-$i$) in a population list (308). If there are no principals in the population list (308), it still holds it as a blank list. The presentity state monitoring part (322) waits for a state (306) to be issued by the state managing module (301a).

The buddy list generating module (303) compares each of the entities in the population list (308) acquired from the state monitoring module (302) with the states (306) of the principals (305) acquired from the state managing module (301), and generates a selection list (309) consisting of the entities of the principals (305-$i$) that are in specific relationships with the states (306) of the principals (305). The process of generating a selection list (309) is performed by the selection list generating part (331). When utilizing a blank population list (308) with no principals contained, the selection list generating part (331) generates a blank selection list. A generation rule (310), which describes a required relationship between the state (306) of the principal (305) and that of the principals (305-$i$) in the population list (308), is stored in the generation rule storing part (332). The generation rule managing part (333) changes the generation rule (310) stored in the generation rule storing part (332) in response to an action by the principal, an entry of the state of the principal, or an entry of other information (e.g., time of day).

The buddy list managing module (304) holds a selection list (309). The selection list (309) is stored in the buddy list storing part (341) within the buddy list managing module (304).

(Description of the Operation of the Fourth Embodiment)

The operation of the fourth embodiment, in Steps A to E, will be described below.

A. When a change occurs in the state of a principal (305), the state managing module (301) for the principal (305) issues the change to the buddy list generating module (303).

1. The principal state monitoring part (312) acquires a state from a principal (305), and compares it with the state (306) stored in the principal state storing part (311).

2. If the state (306) is different from the previous state:

2-1. The principal state storing part (311) updates the state (306) to a new state.

2-2. The principal state storing part (311) issues the new state (306) to the buddy list generating module (303).

B. When a change occurs in the states (306-$i$) of the principals (305-$i$), the state managing modules (1a-$i$) for the principals (305-$i$) ($1 \leq i \leq n$) issue the change to the state monitoring modules.

C. The state monitoring module (302) receives a state change notification for other principals (305-$i$), and issues it to the buddy list generating module (303).

1. The presentity state monitoring part (322) waits until a new state is issued from any of the state managing modules, (301a-1), (301a-2), . . . , (301a-n), for the principals associated with the entities in the population list (308).

2. Upon receiving a new state from any (301a-$i$) of the state managing modules, (301a-1), (301a-2), . . . , (301a-n), the presentity state monitoring part (322) compares the new state with the states of the principals (305-$i$) on the population list (308) stored in the presentity state storing part (321).

3. If the state (306) is different from the previous state:

3-1. The presentity state storing part (321) updates the state of the principals (305-$i$) on the population list (308).

3-2. Upon completion of updating the state of the applicable entity in the population list, the presentity state storing part (321) passes the population list (308) to the buddy list generating module (303).

D. Upon receiving a change in the states of the principals (305) of other principals in Step A or C, the buddy list generating module (303) re-creates a selection list and issues the new selection list to the buddy list managing module (304).

1. The selection list generating part (331) waits for a new state (306) of the principal (305) to be issued by the state managing module (301). It also waits for a new population list (308) to be issued by the state monitoring module (302).

2. Upon receiving either a new state (306) of a principal (305) or a new population list (308), the selection list generating part (331) performs the process as described below.

2-1. If it receives a new state (306) of a principal (305) from the state managing module (301), the selection list generating part (331) acquires a population list (308) from the state monitoring module (302).

2-2. If it receives a new population list (308) from the state monitoring module (302), the selection list generating part (331) acquires a state (306) from the state managing module (301).

3. The selection list generating part (331) searches the population list (308) to retrieve an entity having a state whose relationship with the state (306) of the principal (305) is as specified in the generation rule (310). Zero or more entities thus retrieved are used as the entities in a new selection list. The selection list generating part (331) passes the resultant selection list (309) to the buddy list managing module (304).

E. The buddy list managing module (304) holds the latest selection list (309) issued by the buddy list generating module and presents it to the principal.

Concrete Example 1

Using Concrete Example 1, the fourth embodiment will further be described, with focus on how the buddy list for User A will change in response to state changes. User A herein corresponds to the principal (305) in FIG. 10.

In addition to User A, the presence service is participated by many other users (User B, User C, . . . ). These users correspond to the principals (305-i) in FIG. 10. Every user of the presence service has presence information consisting of at least his or her communication state and location. It is possible to monitor (subscribe to) the communication state and location of any user.

A communication state can take a value of "Online" or "Offline." "Online" means that the user can answer a phone call, while "Offline" means that user cannot. A location for the purpose of Concrete Example 1 is represented by the name of the nearest station from where the user is actually located. If, for example, "Tokyo" is given as a user's location, it means that Tokyo Station is the nearest station from where the user is.

When the state of User A changes, the processing progresses in the order of Action 1-1, Action 2 and Action 3. When the state of a user other than User A changes, the processing progresses in the order of Action 1-2, Action 2 and Action 3. If User A changes the generation rule in his or her buddy list, Action 4 will take place.

(Action 1-1)

1. User A enters a new location "Yokohama" in the state managing module. When User A enters a new state, the state managing module performs the process described below.

2. If the state entered by User A is different from the state held in the state managing module, it discards the old state and holds the state just entered instead. For example, if the location of User A currently held by the state managing module is "Tokyo," this location will be replaced with "Yokohama."

3. It causes the processing by the buddy list generating module to initiate.

(Action 1-2)

1. The state monitoring module is waiting for a state change notification message to arrive from any of the users contained in the population list.

2. User B changes the location from "Shinjuku" to "Tokyo," and issues a state change notification to the state monitoring module.

3. The state monitoring module searches the lists belonging to all the users on the population list that it holds internally to retrieve the entities associated with User B, and changes the location state to "Tokyo."

4. It causes the processing by the buddy list generating module to initiate.

(Action 2)

The buddy list generating module performs the following process.

1. It acquires User A's location from the state managing module. The state managing module passes the location state of User A that it holds internally to the buddy list generating module.

2. From the state monitoring module, it acquires a population list consisting of the URIs and location presences of all the users under the monitoring by the state monitoring module.

3. It searches the population list to retrieve the entities that match the generation rule. It then copies zero or more entities thus found into the selection list. We assume here that the generation rule reads "IF the location of a user on the population list=the location of User A, THEN add the user on the population list." If User A's location is "Tokyo" and the locations of User B and User E are both "Tokyo," then the entities of User B and User E will be stored in the selection list.

4. It passes the selection list to the buddy list managing module.

(Action 3)

The buddy list managing module performs the following process.

1. It acquires a new selection list from the buddy list generating module.

2. It presents to User A the communication states of the users contained in the new selection list.

If User A changes the generation rule, Action 4 will take place.

(Action 4)

1. User A enters a new generation rule in the buddy list generating module, which reads "IF the location of a user on the population list is within two stations from User A's location, THEN add the user on the population list."

2. The buddy list generating module discards the old generation rule it holds internally and stores the new generation rule just entered instead.

Concrete Example 2

Another concrete example, wherein the present invention is applied to the phone book function of a cellular phone, will be described below. The users in this example disclose their work state and manner mode setting state to the presence service. The work state is represented by "At work" and "Private," while the manner mode setting state by "On manner mode" and "Off manner mode." The state managing module implemented in a cellular phone acquires these states from a user's button operation and stores them. When either of the states changes, it issues the new state to the buddy list generating module.

The state monitoring module monitors the work state and the manner mode setting state of each person listed in the phone book of a user's cellular phone. The population list held by the state monitoring module is integrated with the phone book, and the work state and the manner mode setting state of each person are stored with his or her phone number. If a change occurs in the state of any person in the phone book, the state monitoring module issues a new population list to the buddy list generating module.

The user has set in the buddy list generating module implemented in his or her cellular phone a generation rule that reads "IF the work state of a person listed in the phone book=my own work state AND the manner mode setting state of a person listed in the phone book=Off manner mode, THEN add the person listed in the phone book in the selection list." When the buddy list generating module receives own state issued by the state managing module or a population list issued by the state monitoring module, it applies the above-described generation rule to generate a selection list.

The selection list thus generated appears on the screen when the user presses a key to display the phone book of his or her cellular phone. If the user's work state is "Private," a list of the persons in the phone book whose work state is "Private" and whose manner mode setting state is "Off manner mode" is displayed on the screen. The states of the user and those of the persons listed in the phone book change continuously over time. However, the selection list displayed when the user presses the appropriate key will always be the updated one that reflects the current states of the user and the persons listed in the phone book.

Fifth Embodiment

Figure 11:
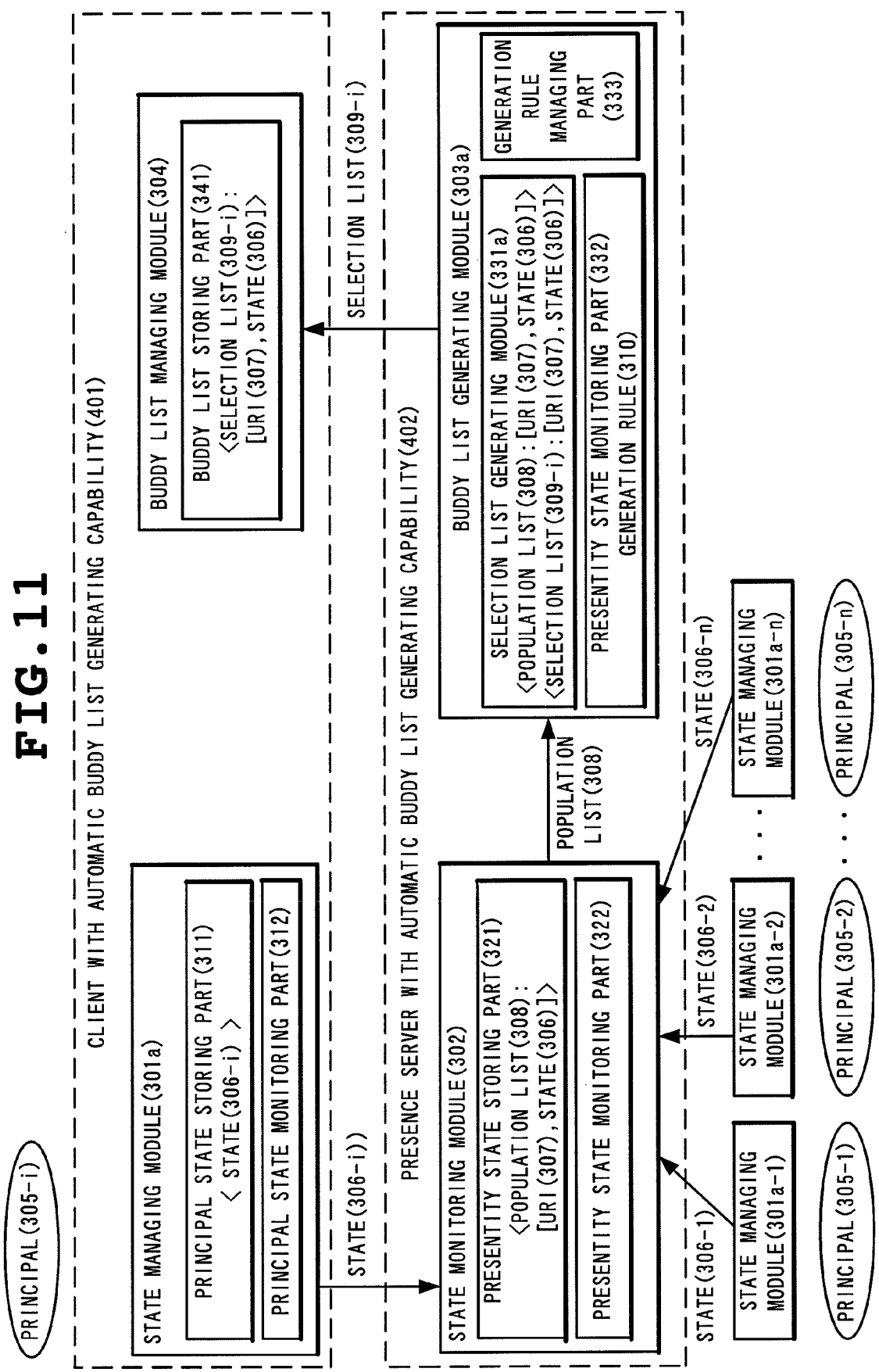
FIG. 11 is a configuration diagram for the fifth embodiment of the present invention.

The configuration of the fifth embodiment of the present invention is shown in FIG. 11. The fifth embodiment comprises a client with automatic buddy list generating capability (401), a presence server with automatic buddy list generating capability (402) and a state managing module belonging to other client (301a). The client with automatic buddy list generating capability (401) includes a state managing module (301a) and a buddy list managing module (304). There are a total of n clients, including clients with automatic buddy list generating capability (401).

As shown in FIG. 11, the clients for the principals (305-$i$) ($1 \leq i \leq n$) are those with automatic buddy list generating capability. The presence server with automatic generating capability (402) includes a state monitoring module (302) and a buddy list generating module (303a). One client has all the modules in the fourth embodiment, while in the fifth embodiment one server incorporates modules that are shared by a plurality of clients. All the clients are connected with each other via the presence server with automatic buddy list generating capability (402) and a network.

The state managing module (301a) issues the states (306-$i$) to the state monitoring module (302) over the network.

The state monitoring module (302) of the fifth embodiment has the same capabilities as the state monitoring module (302) of the fourth embodiment. However, since the module of the fifth embodiment is on a server, the population list (308) it holds contains the URIs (307) and states (306) of all the principals.

The buddy list generating module (303a) acquires a population list (308) from the state monitoring module (302). A selection list is generated separately for each of the entities in the population list (308). Therefore, the buddy list generating module (303a) is capable of generating more than one selection list. Each of the selection lists (309-$i$) is assigned an identifier. The buddy list generating module (303a) issues a selection list (309-$i$) to each of the principals (305-$i$)($1 \leq i \leq n$) who are connected via the network and who have a client with automatic buddy list generating capability (401). The process of generating a selection list is performed by the selection list generating part (331a). The generation rule storing part (332) stores the generation rule (310) for selection lists.

The state monitoring module (304) is the same as the state monitoring module (304) in the fourth embodiment.

In the fourth and fifth embodiments, the buddy list generating module acquires a population list containing all the principals from the state monitoring module every time a change occurs in the state of any of the principals. However, it is also possible to have the buddy list generating module hold a buddy list permanently. In this case, when the state of a principal is changed, the buddy list generating module updates the affected selection list (to which the URI will be added) and the affected selection list (from which the URI will be removed) only, and transmits the updated selection list to those clients holding the selection list before update. By taking this approach, where two or more users share one buddy list generating module, the time required per user for generating a selection list can be reduced.

A buddy list held in the buddy list generating module may be alive for a limited length of time rather than permanently. A buddy list generating module that holds a selection list for a limited length of time as described above may cause a problem because it may hold the principal's own URI in the selection list. In order to prevent this problem, a buddy list generating module may be designed so that, when generating a selection list, the module will exclude the URI of the issuer principal from the selection list.

In the fifth embodiment, a population list may be managed on a principal-to-principal basis, so as to allow each principal to control other principals to be included in a buddy list before generation. In the population list held by each principal, a wild card is available to assist the principal in designating a set of URIs of other principals who may be included in the list.

As is clear from the descriptions above, the following effects can be achieved from the present invention (the fourth and fifth embodiments).

A buddy list can be generated automatically, according to the states of both the user owning the buddy list and other principals included in the buddy list. For example, by using the present invention in a presence service that handles a state indicating whether a principal is at work or on a break in addition to communication states, it is possible to create a buddy list in which the communication state is shown only when the user and any of the other principals are in the same state (e.g., on a break or at work). This also makes said buddy list easier to see. Principals to be shown on a buddy list can be selected automatically, according to the state of its owner user and the states of the principals included in the buddy list. This eliminates the necessity of switching the display page from one buddy list to another or scrolling to display the desired portion of a lengthy buddy list.

The user needs to manage only one set of information. What is required of the user is simply to set conditions for adding principals to a buddy list. The present invention determines principals to be included in a buddy list automatically according to the states of both the user and other principals. Thus, the user does not have to prepare multiple buddy lists to cater to different needs from different contexts in which he or she is expected to be placed. This also saves efforts to add and manage the same principals in different buddy lists.

A buddy list can be generated automatically, according to the states of both the user owning the buddy list and other principals included in the buddy list. For example, by using the present invention in a presence service that handles a state indicating whether a principal is at work or on a break in addition to communication states, it is possible to create a buddy list in which the communication state is shown only when the user and any of the other principals are in the same state (e.g., on a break or at work). This also makes said buddy list easier to see. Principals to be shown on a buddy list can be selected automatically, according to the state of its owner user and the states of the principals included in the buddy list. This eliminates the necessity of switching the display page from one buddy list to another or scrolling to display the desired portion of a lengthy buddy list. This is particularly convenient when the user is not aware of URIs of others, since the URIs of the presentities needed by the server will be included in a buddy list to be provided to the user. These effects are realized by the fifth embodiment. For example, in a presence service that handles communication state and location state as presence information, taxis cruising near a prospective passenger can be included in a buddy list. Since the intermediate server provides a buddy list as necessary according to the location of a passenger, the passenger does not have to add several hundreds of taxis in his or her buddy list and pick up one taxi cruising in the vicinity from the buddy list.

The user needs to manage only one set of information. What is required of the user is simply to set conditions for adding principals to a buddy list. The present invention determines principals to be included in a buddy list automatically according to the states of both the user and other principals. Thus, the user does not have to prepare multiple buddy lists to cater to different needs from different contexts in which he or she is expected to be placed. This also saves efforts to add and manage the same principals in different buddy lists.

Figure 12:
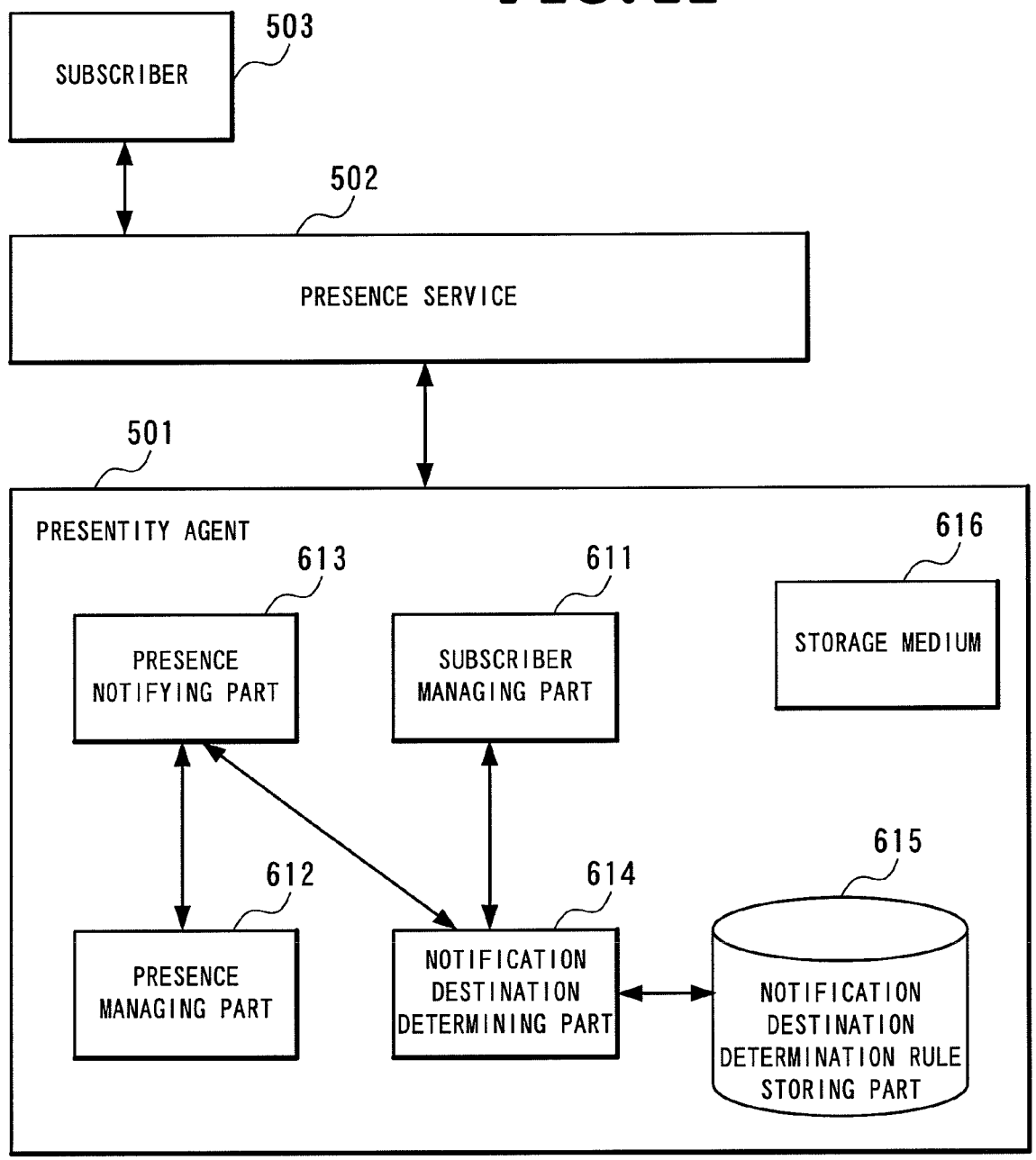
FIG. 12 is a block diagram showing the configuration of a presence system according to the sixth embodiment of the present invention.

Other embodiments of the present invention will now be described in detail referring to the drawings. FIG. 12 is a block diagram showing the configuration of a presence system according to the sixth embodiment of the present invention. In FIG. 12, the presence system according to the sixth embodiment of the present invention comprises a presentity agent 501 for providing own presence information; a subscriber 503 (a watcher performing a subscription) for observing presence information; and a presence service 502 for receiving presence information from the presentity agent 501 and delivering it to the subscriber 503.

The presentity agent 501, the subscriber 503 and the presence service 502 are all logical components of the presence system. These may be combined in a peer-to-peer configuration, wherein a server for a presence service is not needed when deploying a system on a network, or otherwise in a distributed configuration, wherein some presentity and subscriber functions are distributed between a client terminal and a server terminal. The present invention can be implemented in either configuration.

In a presentity agent 501, which is a logical component, the above-mentioned "presence information" refers to a set of information that at least indicates the state of own entity. The "state" herein may be different depending on what the presentity represents, and may include the communication state of a person (e.g., "Busy," "Available," "Power off"), the utilization state of equipment (e.g., "In use," "Available," "Failed"), the state of a person (e.g., "At desk work," "In a meeting," "On a break," "Eating," "Sleeping").

The presentity agent 501 comprises a subscriber managing part 611, a presence managing part 612, a presence notifying part 613, a notification destination determining part 614, a notification destination determination rule storing part 15, and a recording medium 616. The recording medium 616 stores a computer-executable program, which is executed by the presentity agent 501 to realize the processing by the above-mentioned parts.

The subscriber managing part 611 is connected with subscribers through the presence service 502 and manages a list of subscribers 503 desiring to be notified of presence changes. The presence managing part 612 manages the current presence for a presentity.

The notification destination determining part 614 determines which of the subscribers 503 being managed by the subscriber managing part 611 should be notified of presence changes, in accordance with a rule acquired from the notification destination determination rule storing part 15. The presence notifying part 613 notifies presence changes to the subscribers 503 that have been determined by the notification destination determining part 614.

A presence notification destination determination rule can be based on an attribute or activity of subscribers 503, the presence state for the presentity and so on, and can be set in any form. Examples of such rule include "Notify the first subscriber to perform a subscription," "Notify subscribers belonging to a specified group," and "Notify subscribers belonging to the private group if the presence for the presentity is "Free." The "presence" for the purpose of the sixth embodiment of the present invention can include not only the communication state of a person but also the utilization state of equipment, etc., as described above.

Figure 13:
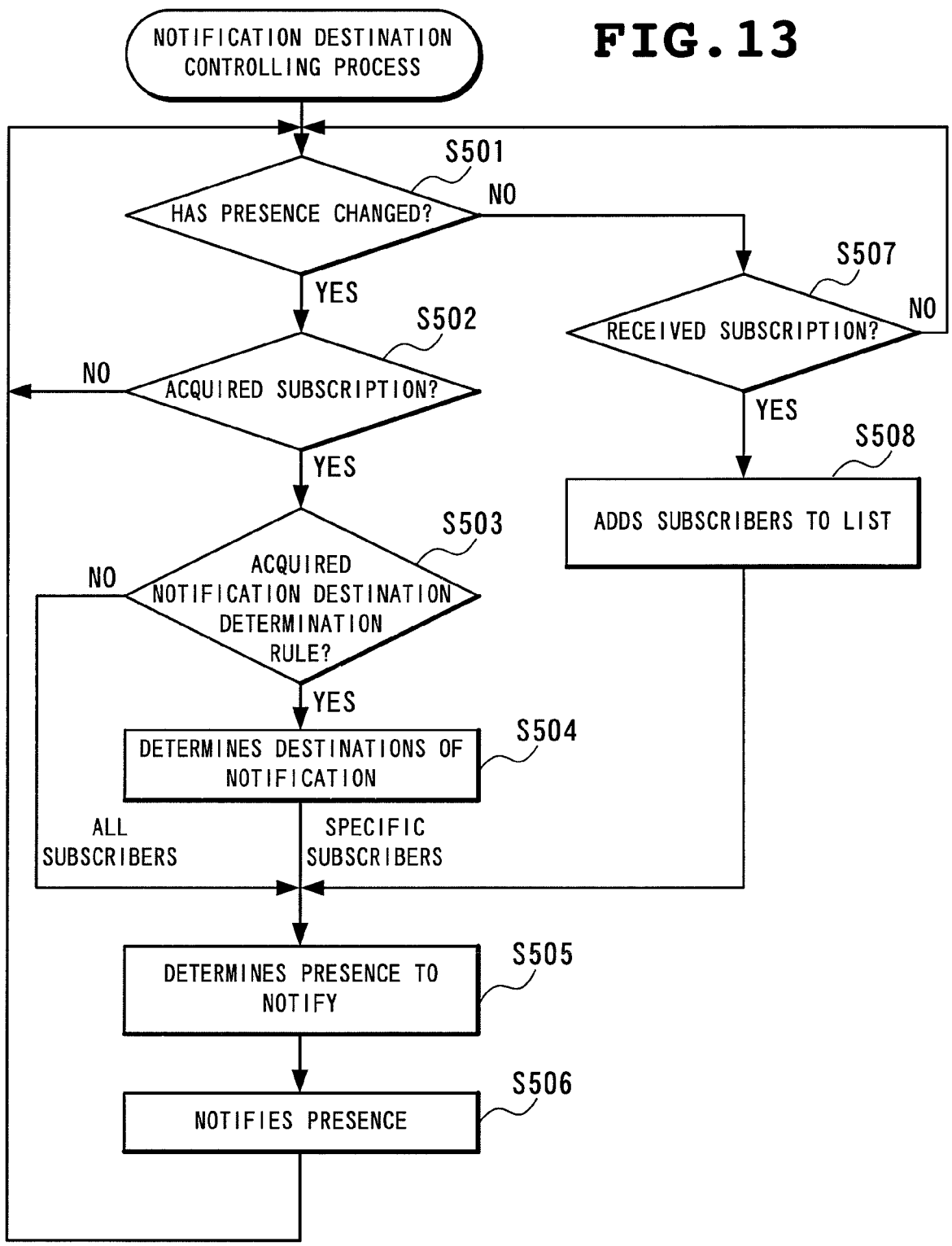
FIG. 13 is a flow chart showing the operation of the presentity agent in FIG. 12.

FIG. 13 is a flow chart showing the operation of the presentity agent 501 in FIG. 12. With reference to FIGS. 12 and 13, the process of controlling presence notification destinations in a presence system according to the sixth embodiment of the present invention will now be described. The process shown in FIG. 13 is realized by the presentity agent 501 by executing the program stored in the recording medium 616.

Upon receiving a request for a presence notification (a subscribe message) from a subscriber 503 (Step S507 in FIG. 13), the entity agent 501 adds subscribers 503 to the list held in the subscriber managing part 611 (not shown) (Step S508 in FIG. 13). The presentity agent 501 also notifies the presence to each subscriber 503 that has issued a subscribe message (Step S505, S506 in FIG. 13).

If a change occurs in a presence managed by the presence managing part 612 (Step S501 in FIG. 13), the presentity agent 501 requests the presence notifying part 613 to notify the presence change.

The presence notifying part 613 requests the notification destination determining part 614 to provide a list of subscribers 503 to which it should actually send a notification of the presence change. From the list of subscribers 503 acquired from the subscriber managing part 611, the notification destination determining part 614 acquires the subscribers 503 determined in accordance with the notification destination determination rule (Steps S502 to S504 in FIG. 13), and returns them to the presence notifying part 613.

The presence notifying part 613 notifies the presence change to the subscribers 503 acquired from the notification destination determining part 614 (Step S505, S506 in FIG. 13). The presentity agent 501 repeats the process of controlling presence notification destinations described above as necessary.

Figure 14:
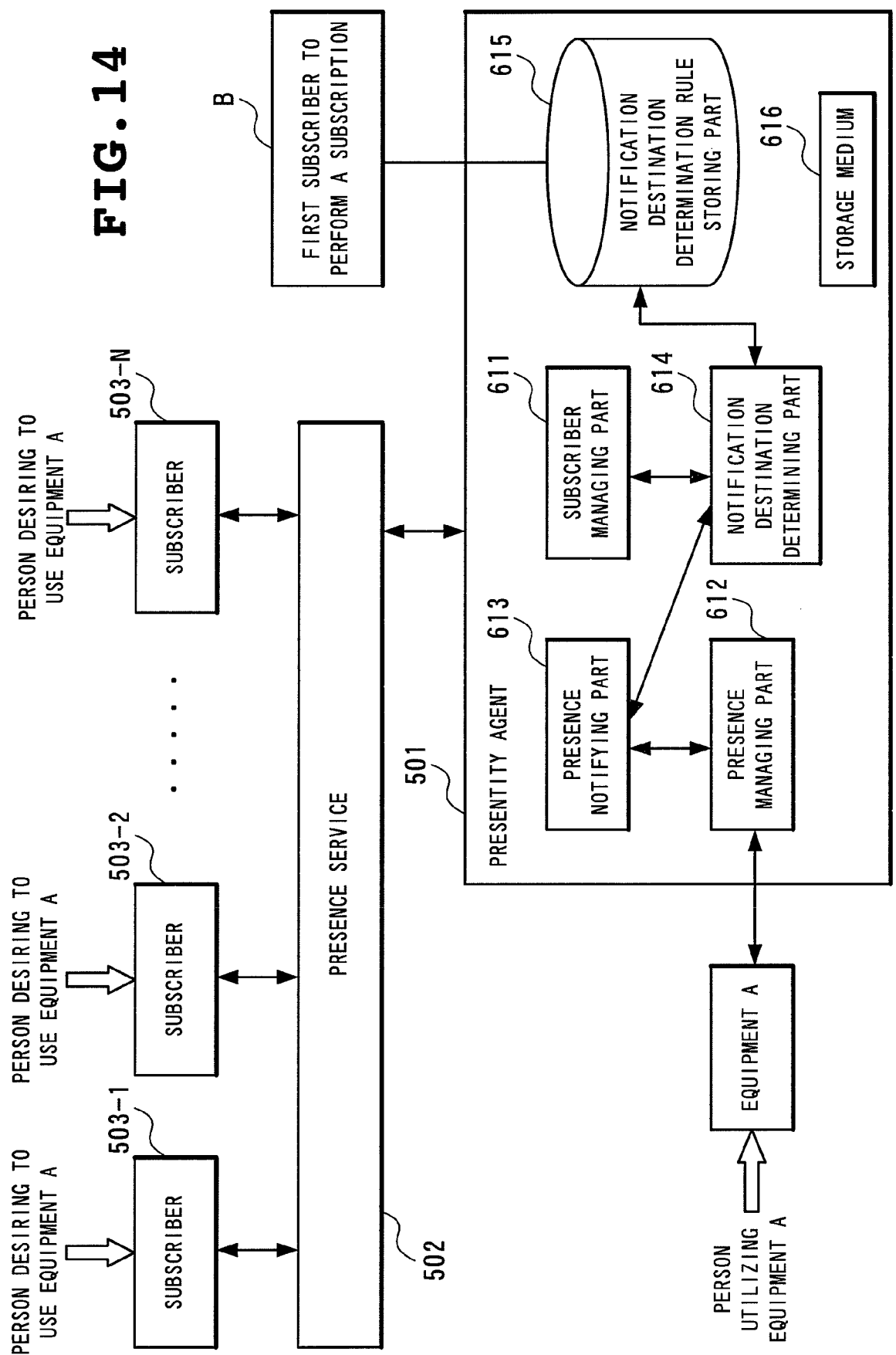
FIG. 14 is a block diagram showing a concrete example of a presence system according to the sixth embodiment of the present invention.

FIG. 14 is a block diagram showing a concrete example of a presence system according to the sixth embodiment of the present invention. FIG. 14 assumes a situation where the utilization status of Equipment A is managed by the presentity agent 501.

The presence for the presentity in this example is either of the two states: "In use" or "Available." From their subscribers 503-1 to 503-N, persons desiring to use Equipment A can monitor the utilization status of Equipment A through the presence service 502, and utilize this equipment when receiving a notification of the "Available" state.

We assume here that the notification destination determination rule that has been set reads "Notify the first subscriber to perform a subscription" B. Therefore, from the subscribers 503-1 to 503-N being managed by the subscriber managing part 611, the first subscriber to perform a subscription is selected by the presentity agent 501 as the destination of a notification of the presence change.

From their subscribers 503-1 to 503-N, persons desiring to use Equipment A monitor the utilization status of Equipment A by performing a subscription for the presentity agent 501 corresponding to Equipment A through the presence service 502. If Equipment A is in the "Available" state when a person desiring to use Equipment A performs a subscription for Equipment A, the person can terminate the monitoring (subscription) and begin utilizing Equipment A immediately.

The following is the operation that will take place when Equipment A is "In use" and when more than one persons desiring to utilize Equipment A are performing a subscription for the equipment. In this example, persons desiring to utilize Equipment A are identified as 503-1, 503-2, . . . , 503-N, according to the order of performing a subscription, and have received a notification of "In use" in response to their subscription messages.

When the utilization status for Equipment A changes from "In use" to "Available," the presence managing part 612 of the presentity agent 501 requests the presence notifying part 613 to notify the presence change. The presence notifying part 613 requests the notification destination determining part 614 to provide a list of subscribers 503-1 to 503-N to which it should actually send a notification.

From the list of subscribers 503-1 to 503-N acquired from the subscriber managing part 611, the notification destination determining part 614 acquires Subscriber 503-1 in accordance with the notification destination determination rule, "Notify the first subscriber to perform a subscription" B, and returns it to the presence notifying part 613.

The presence notifying part 613 notifies the "Available" state to Subscriber 503-1 thus acquired. Upon receiving a notification of the "Available" state, Subscriber 503-1 stops subscribing and begins using Equipment A, which causes the utilization status of Equipment A managed by the presence managing part 612 to change to "In use."

When Subscriber 503-1 finishes using Equipment A, the operation returns to the step of requesting from the presence managing part 612 to the presence notifying part 613 to notify the presence change.

In this case, it is possible that nobody may be able to use Equipment A if Subscriber 503-1 that has been notified of the "Available" state does eventually not begin using Equipment A. In order to prevent this from happening in the process of subscriber 503-1 that has been notified of the "Available" state, it may be arranged such that the operation returns to the step of requesting a list from the presence notifying part 613 after a pre-determined length of time elapses without the state of Equipment A changing to "In use." The next person on the list, Subscriber 503-2, will then receive a notification of the "Available" state.

At this time, Subscriber 503-1 may be removed from the list held by the subscriber managing part 611 or be moved to a position of lower priority. The presentity does not necessarily be Equipment A. When the state of a user is chosen as the presentity, the above-described approach may be applied similarly and arranged such that, for example, a call will start when the state of a specific user changes to "Available."

Thus, even if a certain relationship occurs between the presentity and any of Subscribers 503-1 to 503-N, this embodiment can control the establishment of such relationship by using as a trigger a presence change for the presentity and then performing notification of the presence with higher priorities to Subscribers 503-1 to 503-N to be determined in accordance with a specific rule.

This approach of controlling the order of establishing the above-described "relationship" through control of the destinations to which a state change will be notified, can be applied to cases where persons who desire to use Equipment A (who correspond to Subscribers 503) will use Equipment A (which corresponds to a presentity) when the equipment goes into the Available state, or to cases where a certain user (who corresponds to a presentity) wants to begin communicating with another user (who is one of Subscribers 503) when the former user goes online.

By taking this approach, even in cases where the establishment of a "relationship" between one presentity and any of Subscribers 503, 503-1 to 503-N, prevents the rest of the subscribers from establishing a relationship with that presentity, this embodiment can guarantee that the presentity can establish a relationship with all of Subscribers 503-1 to 503-N that desire to do so by providing a notification to the subscribers in the order of, for example, performing a subscription.

If, for example, the presence indicates whether Equipment A is "In use" or not, it becomes possible to give use permission to all the users desiring to use Equipment A in an appropriate order.

Furthermore, this embodiment can also enable control in cases where it is desirable to notify a change to a specific state to a specific Subscriber 503 only. By performing such control, one can restrict the destinations to very close friends when notifying that he or she is free and wants to go out for a drink. It is also possible to restrict the destinations to the administrator and the repair shop when notifying the operation status of "Failed" for Equipment A, thereby avoiding sending an irrelevant notification to users While in the sixth embodiment of the present invention sends a notification to one of Subscribers 503-1 to 503-N only, a notification can be sent to two or more Subscribers 503-1 to 503-N at a time. In this case, notifications of presence information to be received by different Subscribers 503-1 to 503-N at a time can be different from each other.

The sixth embodiment of the present invention determines the destinations of notification simply by following the order of subscription. However, if users continue their subscriptions for Equipment A repeatedly, it can be arranged such that subscribers are given priority in receiving the "Available" state notification according to the descending order of the length of time that has elapsed since they received a notification of the "In use" state.

Furthermore, in the sixth embodiment of the present invention, if one of Subscribers 503-1 to 503-N on a waiting list goes offline temporarily, the presentity can be made to save the order of Subscriber 503-1 to 503-N at this point in time. By this, such one of Subscriber 503-1 to 503-N can re-issue a subscription after returning to the online state, and resume waiting in the same order on the waiting list as when going offline.

Furthermore, while the sixth embodiment of the present invention determines the destinations of notification simply by following the order of subscription, this order may be determined according to the attributes of Subscribers 503-1 to 503-N. For example, when offering a privileged service to members, notifications may be issued with priority to those subscribers with rights to receive preferential treatment.

In addition to the above, the present invention allows destinations of notification to be changed, depending on the time of day, the state of the presentity or other factors. For example, suppose the presentity represents different states of a user, e.g., "At desk work," "In a meeting," "On a break," "Eating," and "Sleeping." Using the present invention, the destinations of a state notification may be restricted to work-related subscribers during working hours, and to family, friends and other similar subscribers during non-working hours.

In this case, an attribute representing the relationship of a subscriber with the presentity is used in a notification destination determination rule. If two or more relationships exist between a subscriber and the presentity, then these multiple attributes are used in a notification destination determination rule. This means that multiple pieces of presence information for different attributes may be sent at a time to one subscriber if this subscriber has more than one attribute.

In the sixth embodiment of the present invention, since notification is sent only to the subscribers 503 that are determined by the notification destination determining part 614, other subscribers are not able to forecast their waiting times.

By notifying those subscribers that are not included as destinations of notification as to their chronological orders on a waiting list for receiving notifications or other similar information, it becomes possible for these subscribers to forecast their waiting times.

Finally, in the sixth embodiment of the present invention, the subscribers 503 that have received a notification of the "Available" state get the right to use Equipment A. By sending a time-limited electronic ticket together with such notification, the subscribers can confirm their right to use Equipment A through this electronic ticket.

Figure 15:
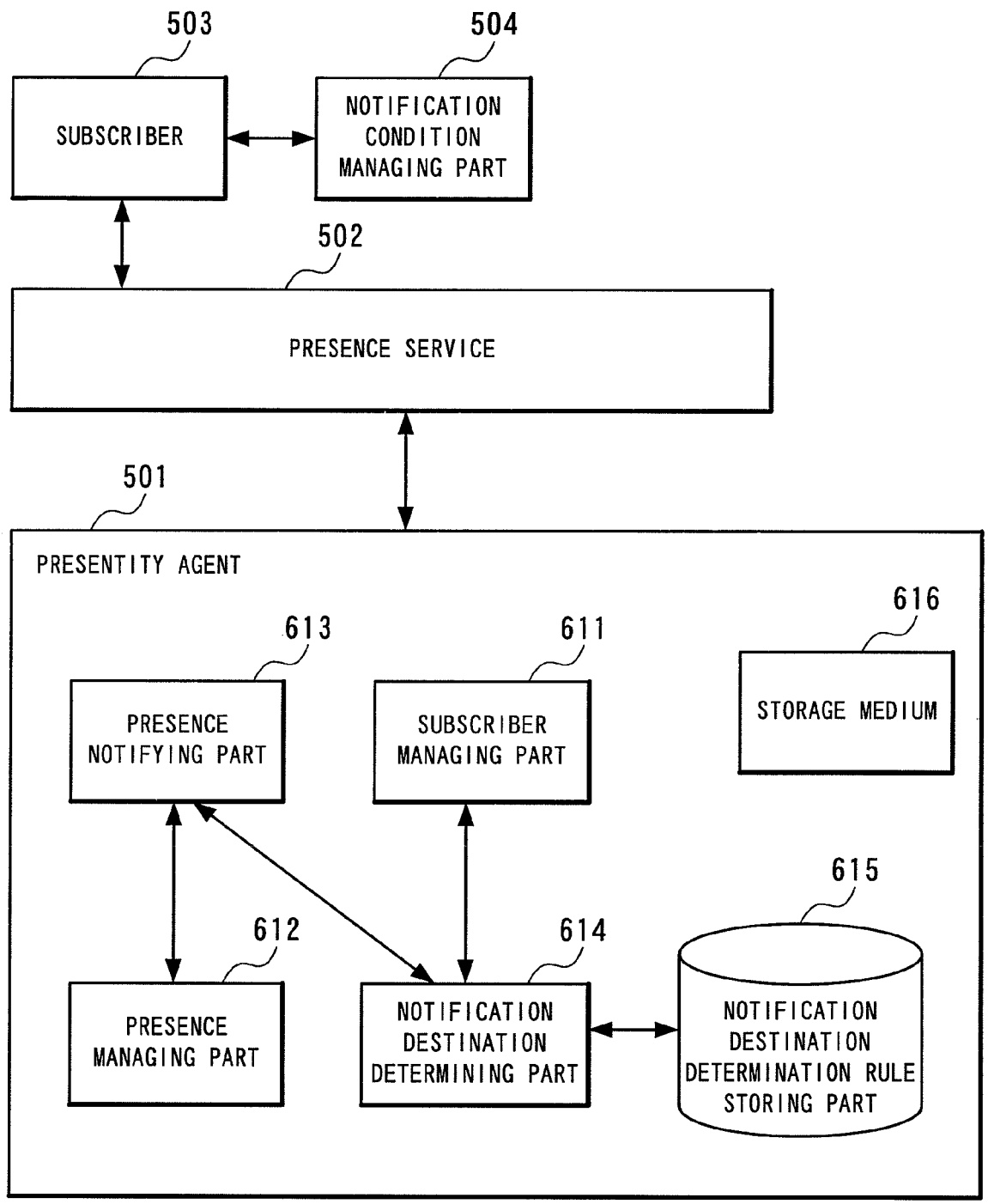
FIG. 15 is a block diagram showing the configuration of a presence system according to the seventh embodiment of the present invention.

FIG. 15 is a block diagram showing the configuration of a presence system according to the seventh embodiment of the present invention. In FIG. 15, the presence system according to the seventh embodiment of the present invention has the same configuration as the presence system according to the sixth embodiment of the present invention in FIG. 12, except that the former system has a notification condition managing part 504 added to the subscriber 503. The components in FIG. 15 are assigned the same number codes as their counterparts in FIG. 12. Similarly, the operation of the components of the seventh embodiment is almost the same as the operation of their counterparts of the sixth embodiment of the present invention. In the section below, the differences of this embodiment from the sixth embodiment will be described.

The seventh embodiment of the present invention uses an approach in which a subscriber 503 issues a subscription to which a notification condition acquired from the notification condition managing part 504 is added.

Figure 16:
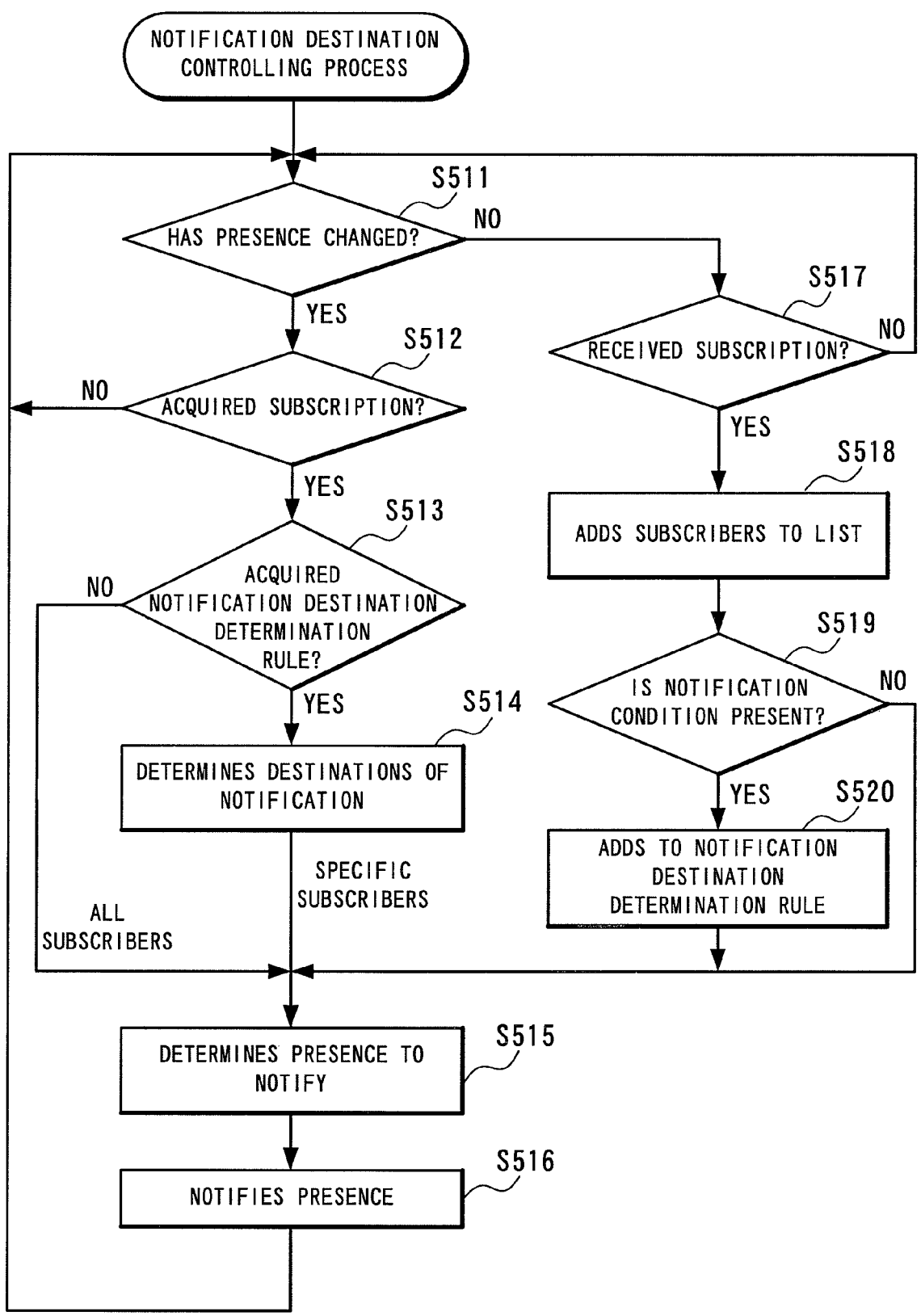
FIG. 16 is a flow chart showing the operation of the presence notification destination controlling process performed by a presence system according to the seventh embodiment of the present invention.

FIG. 16 is a flow chart showing the operation of the presence notification destination controlling process performed by a presence system according to the seventh embodiment of the present invention. With reference to FIGS. 15 and 16, the process of controlling presence notification destinations in a presence system performed by the seventh embodiment of the present invention will now be described. The process shown in FIG. 16 is realized by the presentity agent 501 by executing the program stored in the recording medium 616.

Upon receiving a request for a presence notification (a subscribe message) from a subscriber 503 (Step S517 in FIG. 16), the presentity agent 501 adds subscribers to the list held in the subscriber managing part 611 (not shown) (Step S518 in FIG. 16).

If a notification condition is included in a subscription (Step S519 in FIG. 16), the presentity agent 501 adds the notification condition to the rule stored in the notification destination determination rule storing part 2 as a notification destination determination rule (Step S520 in FIG. 16). The presentity agent 501 also notifies the presence to each subscriber 503 that has issued a subscribe message (Step S515, S516 in FIG. 16).

If a change occurs in a presence managed by the presence managing part 612 (Step S511 in FIG. 16), the presentity agent 501 requests the presence notifying part 613 to notify the presence change.

The presence notifying part 613 requests the notification destination determining part 614 to provide a list of subscribers 503 to which it should actually send a notification of the presence change. From the list of subscribers 503 acquired from the subscriber managing part 611, the notification destination determining part 614 acquires the subscribers 503 determined in accordance with the notification destination determination rule (Steps S512 to S514 in FIG. 16), and returns them to the presence notifying part 613.

The presence notifying part 613 notifies the presence change to the subscribers 503 acquired from the notification destination determining part 614 (Step S515, S516 in FIG. 16). The presentity agent 501 repeats the process of controlling presence notification destinations as necessary.

A rule to be specified as an above-mentioned notification condition may be something like "when the presentity changes to a specific state." Also, a request for participation in a waiting queue can be included in a notification condition. In the seventh embodiment of the present invention, all the subscribers that have issued a subscription are included in a waiting queue.

By requiring subscribers to include expressly a request for participation in their subscription, it becomes possible to realize both subscriptions for simply watching the utilization state of equipment and those for waiting for their turns to use the equipment. If a subscriber that has issued a subscription for simply watching the utilization state come to want to use the equipment, the subscriber must issue a new subscription for participation in a waiting queue. In this case, a notification to be sent to the subscribers participating in a waiting queue will include information indicating the right to use, etc.

Alternatively, a method can be used in which subscribers wanting to participate in a waiting queue are notified using a means other than those for notifying a presence change, for example, IM (Instant Messaging), e-mail, and telephone. For notifying a presence change, a notification may be made to all the subscribers that have issued a subscription, as is the case with ordinary presence services.

Thus, the present invention (the sixth and seventh embodiments) provides an effect that a presentity can perform fine control of the destinations of a state notification.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A dynamic buddy list generation method for automatically generating a buddy list for use by each client on a network to manage state information for own client or other clients, wherein:
   each client has a state managing part which stores state information A for own client; a state monitoring part which stores state information B for other clients and holds a buddy list (population list) that manages said state information B; a buddy list generating part which generates a buddy list (selection list) based on a given generation rule; and a buddy list managing part which holds said selection list,
   and comprising:
   when a change occurs in the state of own client or any other client,
   first step wherein said state managing part updates and transmits said state information A to said buddy list generating part,
   second step wherein said state monitoring part transmits state notification request information which acquires the state after change to other clients included in said population list, and receives from other clients state change notification information in response to said state notification request information and said state information B,
   third step wherein said state monitoring part updates state information B being managed by said population list, based on said state change notification information, and transmits said population list to said buddy list generating part, fourth step wherein said buddy list generating part generates said selection list, based on said state information A received from said state managing part in said first step, said state information B being managed by said population list received from said state monitoring part in said third step, and said generation rule, and transmits said selection list to said buddy list managing part, and fifth step wherein said buddy list managing part holds said selection list received from said buddy list generating part in said fourth step;

wherein said buddy list generating part includes a generation rule managing part which changes said generation rule, and said generation rule managing part has the first changing step of changing said generation rule by reflecting said state information A or B received in said fourth step, and wherein said generation rule managing part has the second changing step of causing a generation rule to be changed in response to the action taken from own client to change said generation rule.

2. A dynamic buddy list generation method for automatically generating a buddy list for a server on a network to manage state information for each client, wherein:

each client includes a state managing part which stores state information C for own client and buddy list managing part which holds a buddy list (selection list) generated and transmitted by a server, wherein the server includes a state monitoring part which stores said state information C and holds a buddy list J (population list) which manages said state information C, and a buddy list generating part which generates said selection list for each client based on the pre-set rule, and comprising:

when a change occurs in a state of any of the clients, sixth step wherein said state managing part updates said state information C, seventh step wherein said state monitoring part transmits state notification request information which acquires the state after change to other clients included in said population list, and receives from other clients state change notification information in response to said state notification request information and said state information C, eighth step wherein said state monitoring part updates state information C being managed by said population list, based on said state change notification information, and transmits said population list to said buddy list generating part, ninth step wherein said buddy list generating part generates said selection list for each client, based on said state information C being managed by said population list received from said state monitoring part in said eighth step and said generation rule, and transmits said selection list to said buddy list managing part of each client, and tenth step wherein said buddy list managing part holds said selection list received from said buddy list generating part in said ninth step;

wherein said buddy list generating part includes a generation rule managing part which changes said generation rule, wherein said generation rule managing part has the third changing step of changing said generation rule by reflecting said state information C received in said ninth step, and wherein said generation rule managing part has the fourth changing step of causing a generation rule to be changed in response to the action taken from each client to change said generation rule.

* * * * *